US011831906B2

(12) United States Patent
Qian

(10) Patent No.: US 11,831,906 B2
(45) Date of Patent: Nov. 28, 2023

(54) AUTOMATED FILM-MAKING USING IMAGE-BASED OBJECT TRACKING

(71) Applicant: HANGZHOU TARO POSITIONING TECHNOLOGY CO., LTD., Hangzhou (CN)

(72) Inventor: Hao Qian, Hangzhou (CN)

(73) Assignee: HANGZHOU TARO POSITIONING TECHNOLOGY CO., LTD., Hangzhou (CN)

( * ) Notice: Subject to any disclaimer, the term of this patent is extended or adjusted under 35 U.S.C. 154(b) by 208 days.

(21) Appl. No.: 17/420,600

(22) PCT Filed: Jan. 2, 2019

(86) PCT No.: PCT/CN2019/070140
§ 371 (c)(1),
(2) Date: Jul. 2, 2021

(87) PCT Pub. No.: WO2020/140210
PCT Pub. Date: Jul. 9, 2020

(65) Prior Publication Data
US 2022/0086482 A1 Mar. 17, 2022

(51) Int. Cl.
*H04N 19/55* (2014.01)
*H04N 19/43* (2014.01)
(Continued)

(52) U.S. Cl.
CPC ............ *H04N 19/55* (2014.11); *G06T 7/246* (2017.01); *H04N 5/145* (2013.01);
(Continued)

(58) Field of Classification Search
CPC ...... H04N 19/55; H04N 5/145; H04N 5/2228; H04N 19/43; H04N 23/74; H04N 23/60;
(Continued)

(56) References Cited

U.S. PATENT DOCUMENTS 6,079,862 A * 6/2000 Kawashima .......... G01S 3/7864
700/59
2002/0140670 A1* 10/2002 Albeck .................. G01C 11/00
345/156
(Continued)

FOREIGN PATENT DOCUMENTS

CN 101451836 A 6/2009
CN 101771815 A 7/2010
(Continued)

OTHER PUBLICATIONS

Office Action issued in corresponding CN Application No. 201980082372.4 dated Aug. 8, 2022 (8 pages).
(Continued)

*Primary Examiner* — Abdelaaziz Tissire
(74) *Attorney, Agent, or Firm* — Osha Bergman Watanabe & Burton LLP

(57) ABSTRACT

A method for image capture. The method includes generating, by disposing a light sensing device (112) at one or more locations in a scene (140), a direction of a visible light source (118) from each of the one or more locations in the scene (140), generating, based at least on the direction of the visible light source (118) and a pre-determined image capture criterion, a physical configuration of the image capture, wherein the physical configuration comprises at least one selected from a group consisting of a target camera location (145b) and a target object location (144b) in the scene (140), and transmitting a command to a camera device (110) to capture an image of an object in the scene (140) based on the physical con-figuration of the image capture.

44 Claims, 11 Drawing Sheets

(51) Int. Cl.
*G06T 7/246* (2017.01)
*H04N 5/14* (2006.01)
*H04N 5/222* (2006.01)
*H04N 23/74* (2023.01)

(52) U.S. Cl.
CPC .......... *H04N 5/2228* (2013.01); *H04N 19/43* (2014.11); *H04N 23/74* (2023.01)

(58) Field of Classification Search
CPC ........ H04N 23/695; H04N 5/33; H04N 23/56; H04N 23/635; G06T 7/246; F16M 11/041; F16M 11/123; F16M 11/18; F16M 13/04; G02B 27/30; G02B 27/34; G02B 27/36; F21V 33/0052; H05B 47/125; F21W 2131/406
See application file for complete search history.

(56) References Cited

U.S. PATENT DOCUMENTS

| | | | | |
|---|---|---|---|---|
| 2008/0231742 A1* | 9/2008 | Kurase | .................. | G03B 15/05 348/E5.022 |
| 2012/0044401 A1* | 2/2012 | Parviainen | ............ | G06F 3/0304 348/333.03 |
| 2012/0200660 A1* | 8/2012 | Verthein | .................. | H04N 7/15 348/E7.083 |
| 2015/0069917 A1* | 3/2015 | Shih | ....................... | H04N 23/74 315/151 |
| 2015/0308642 A1* | 10/2015 | Vo | .......................... | H04N 23/56 362/648 |
| 2016/0178991 A1* | 6/2016 | Wan | ....................... | G03B 15/05 362/11 |
| 2017/0048441 A1 | 2/2017 | Deng et al. | | |
| 2017/0064169 A1* | 3/2017 | Mishra | ................... | H04N 23/74 |
| 2018/0165820 A1* | 6/2018 | Rhodes, Jr. | ............ | G01N 21/01 |
| 2018/0288295 A1* | 10/2018 | Scepanovic | .......... | H04N 23/631 |
| 2019/0116307 A1* | 4/2019 | Pincenti | ................. | G03B 15/03 |

FOREIGN PATENT DOCUMENTS

| | | | |
|---|---|---|---|
| CN | 103810695 | A | 5/2014 |
| CN | 103988227 | A | 8/2014 |
| CN | 105723697 | A | 6/2016 |
| CN | 105981362 | A | 9/2016 |
| EP | 3107065 | A1 | 12/2016 |
| JP | 2004280277 | A * | 10/2004 |

OTHER PUBLICATIONS

International Search Report issued in International Application No. PCT/CN2019/070140 dated Oct. 10, 2019 (4 pages).
Written Opinion issued in International Application No. PCT/CN2019/070140 dated Oct. 10, 2019 (3 pages).

* cited by examiner

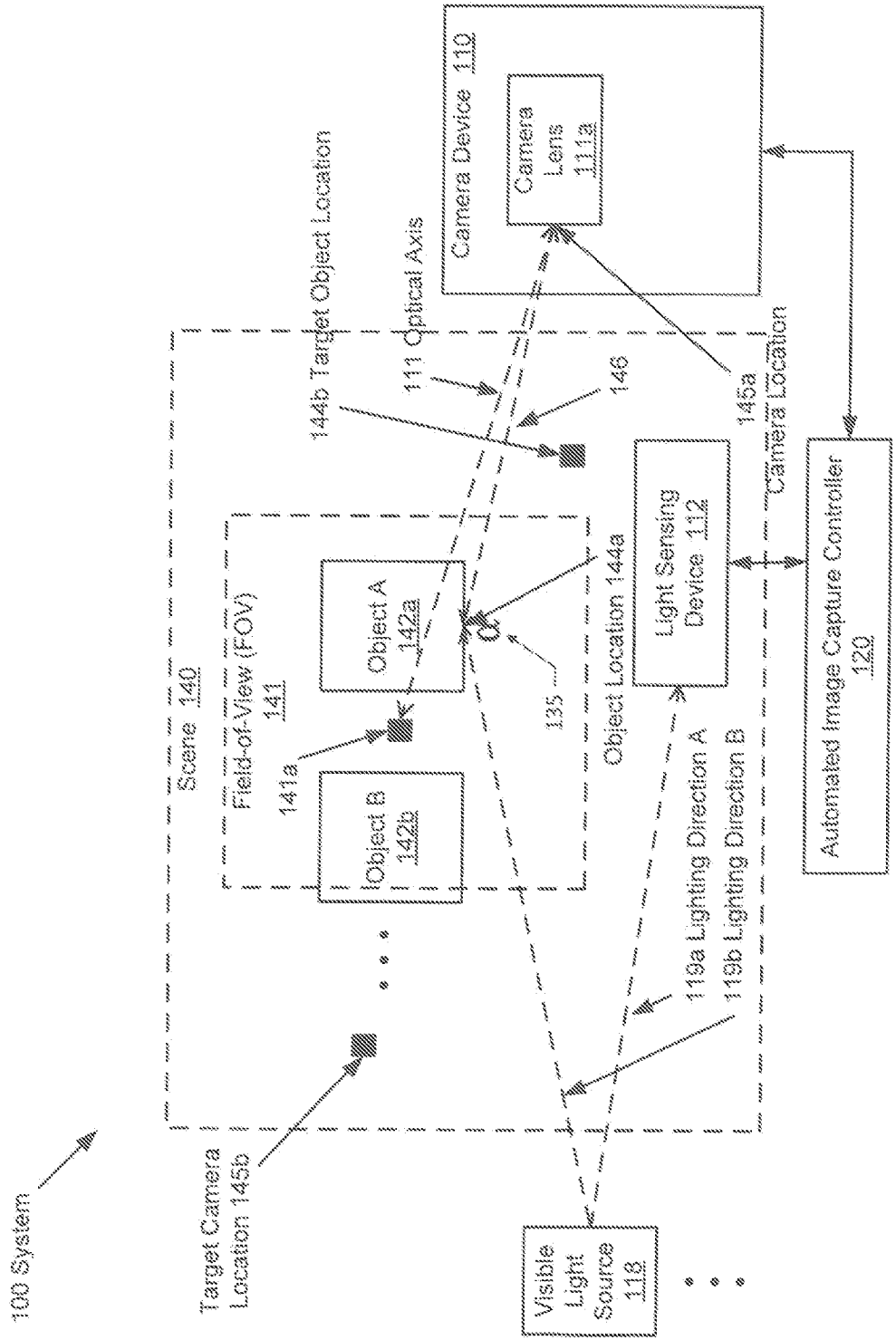
FIG. 1.1

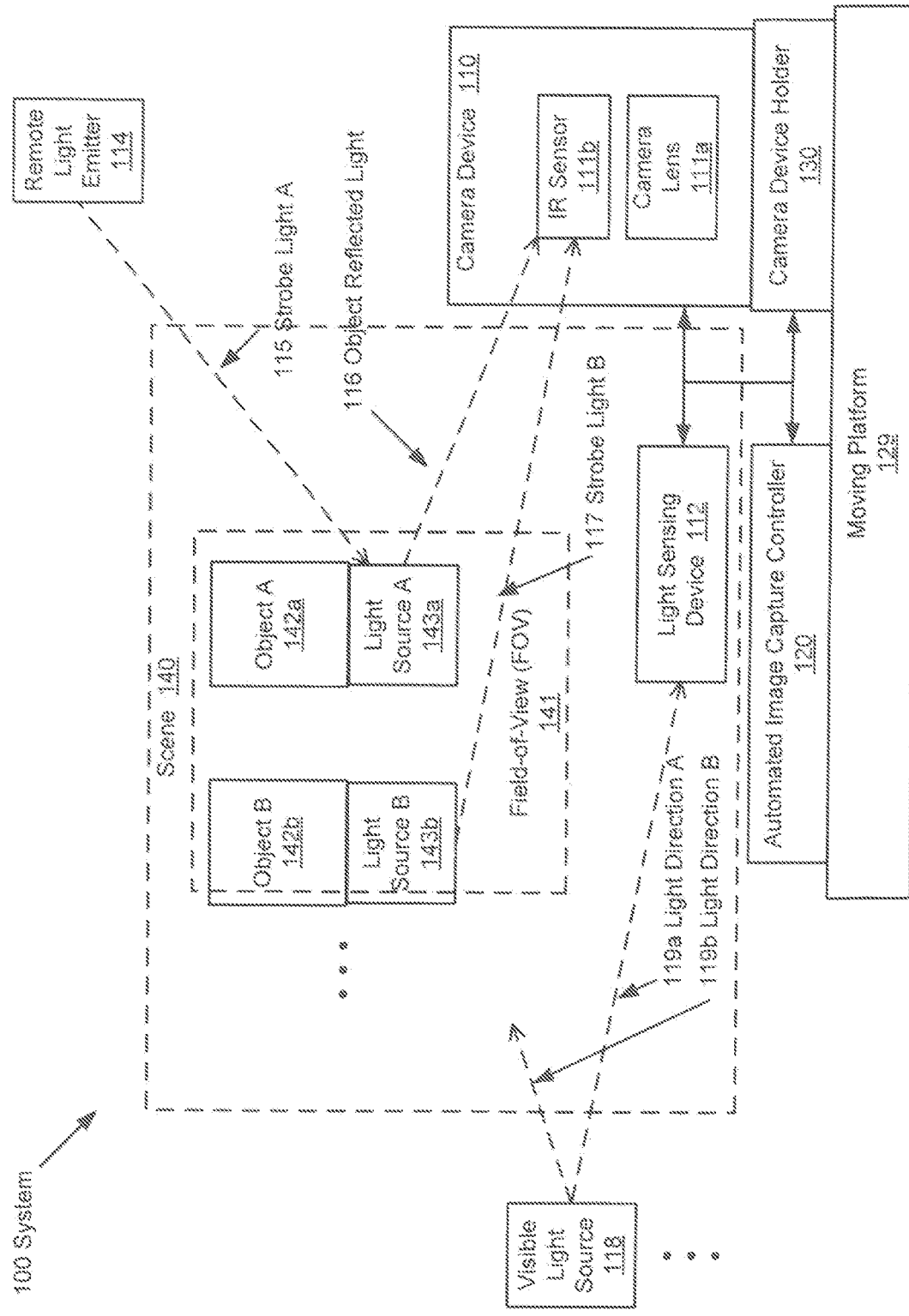
FIG. 1.2

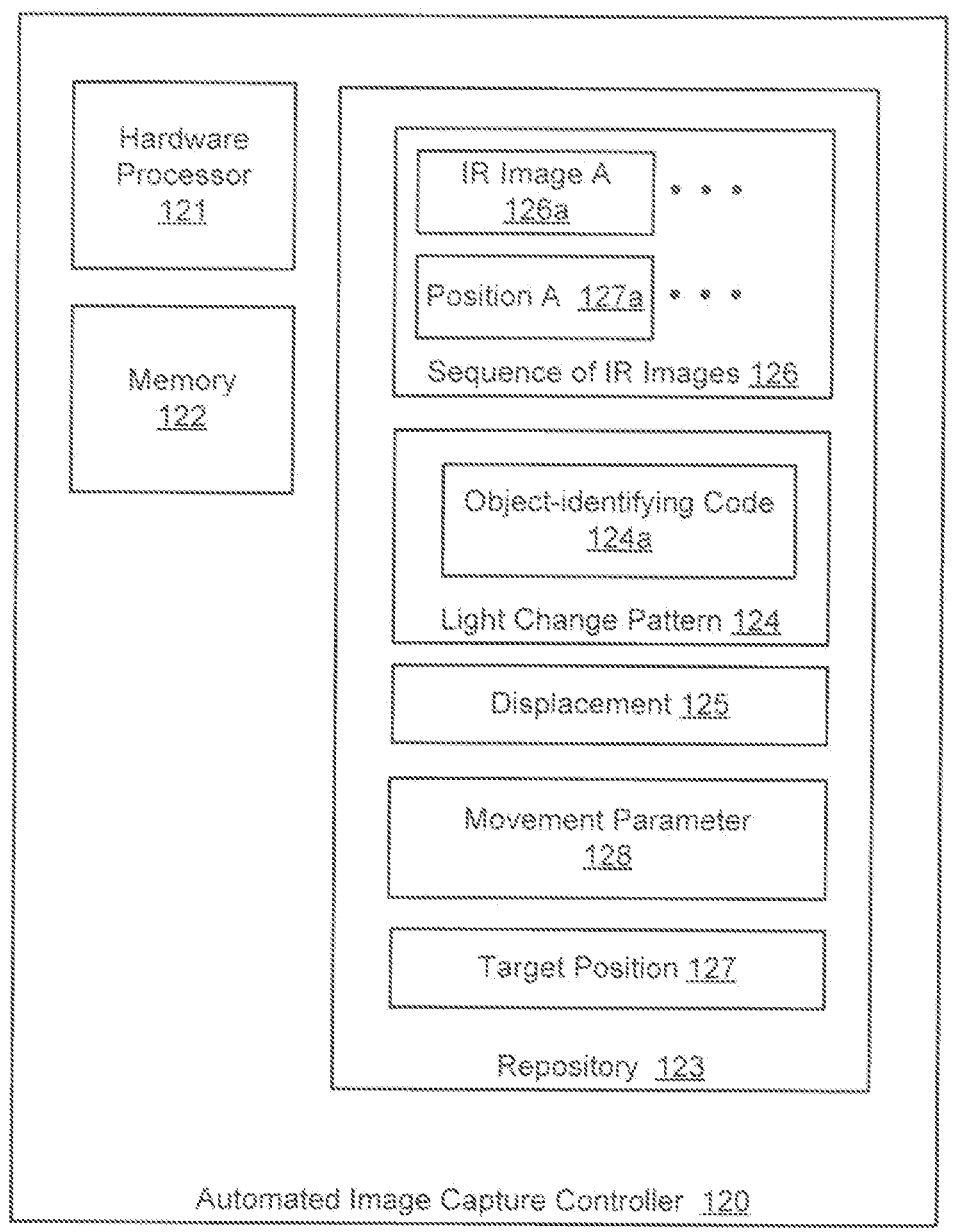
FIG. 1.3

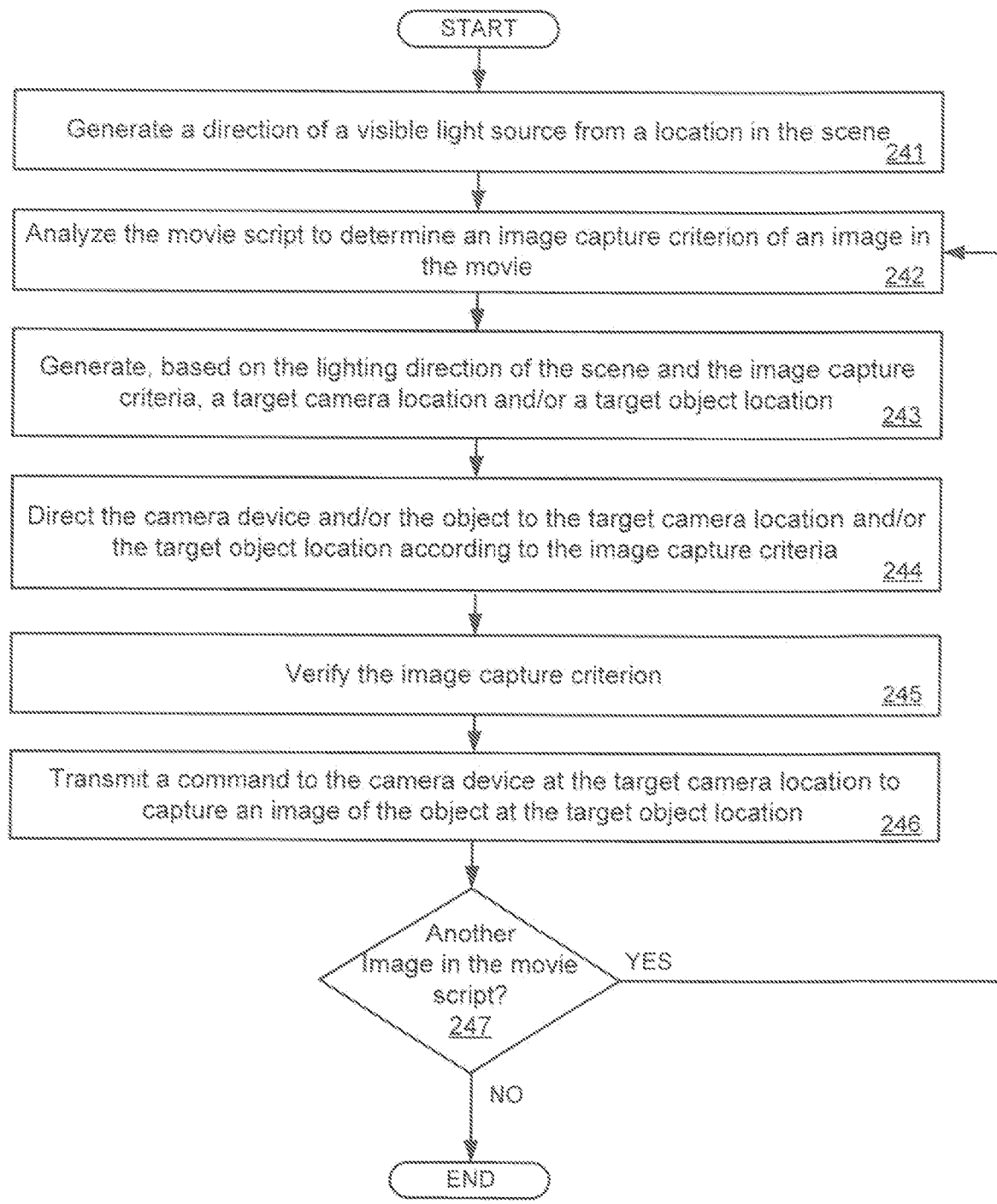
FIG. 2.1

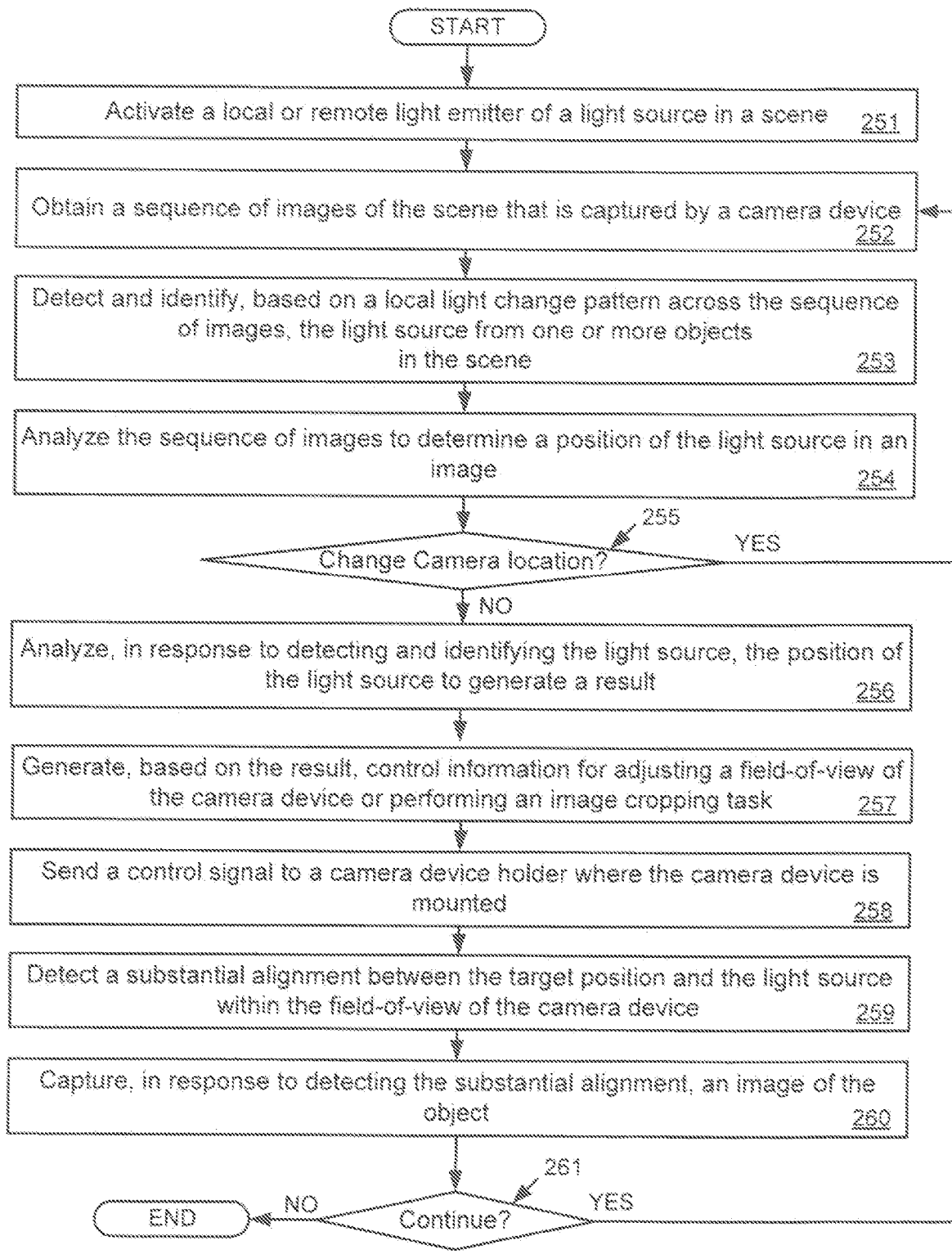
FIG. 2.2

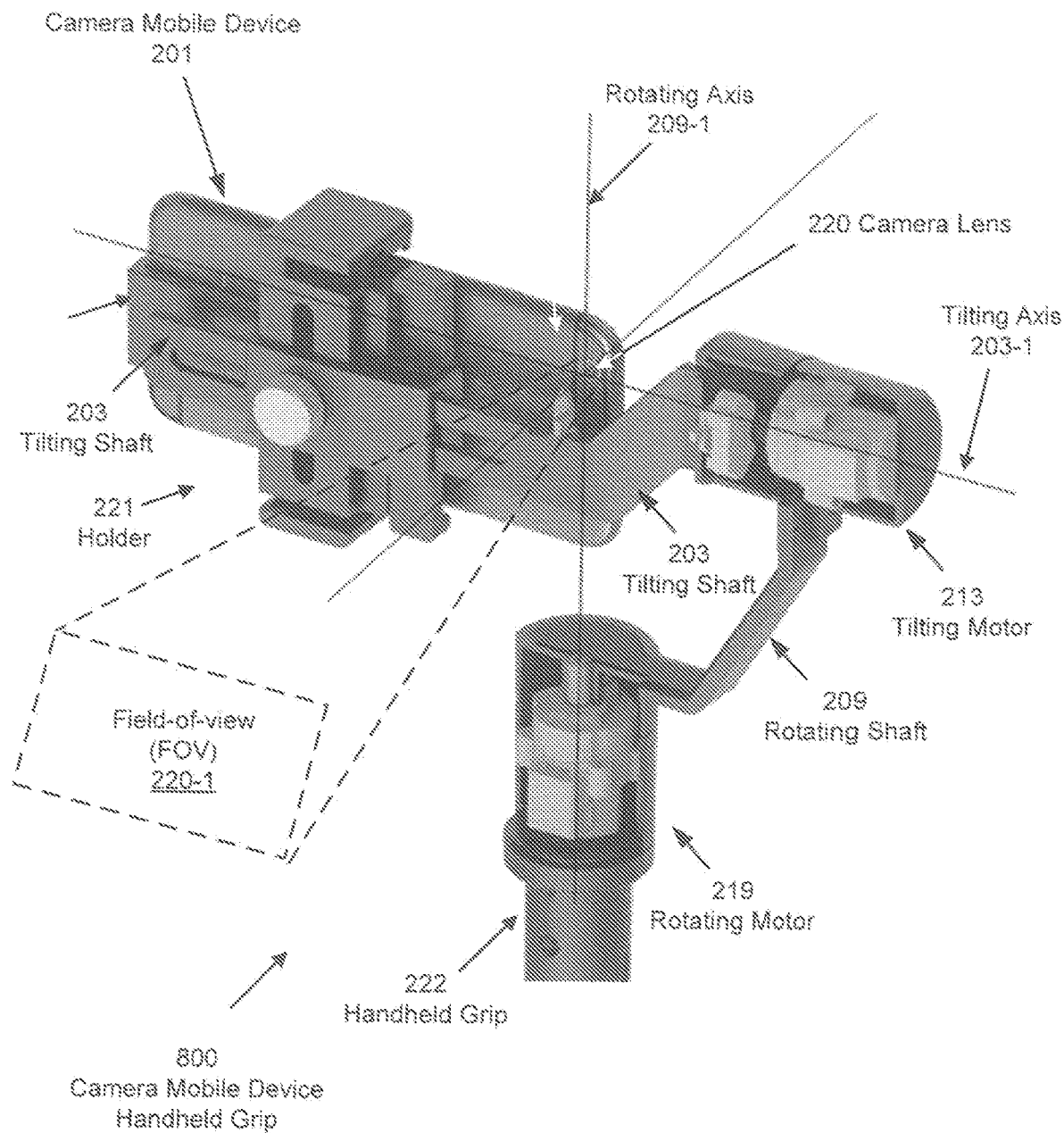
FIG. 3.1

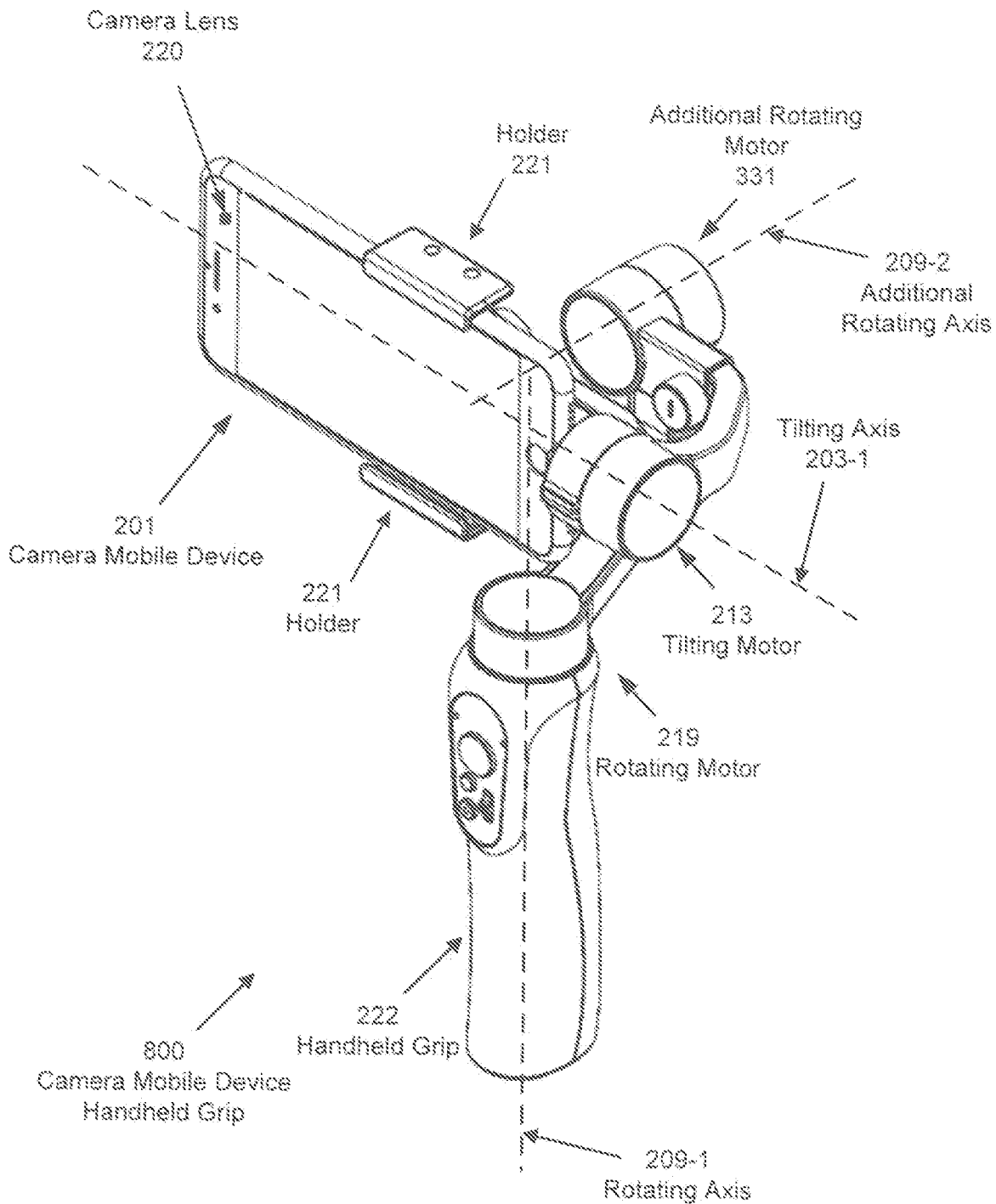
FIG. 3.2

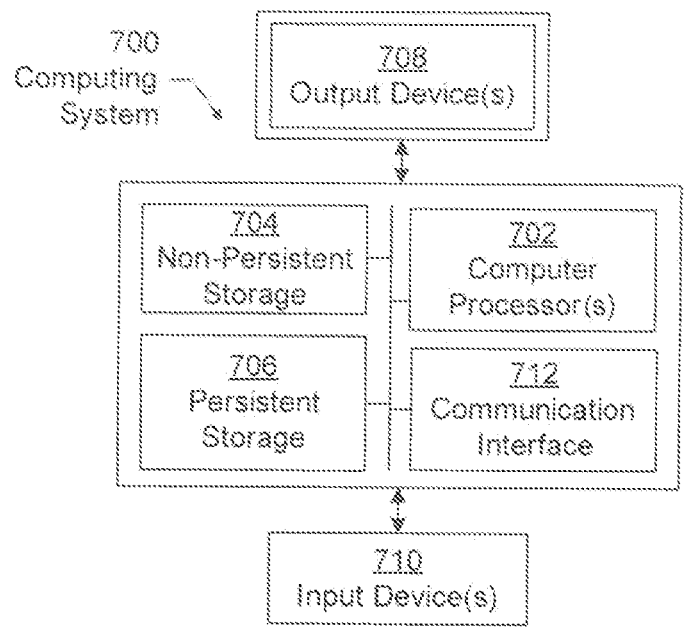
FIG. 7.1
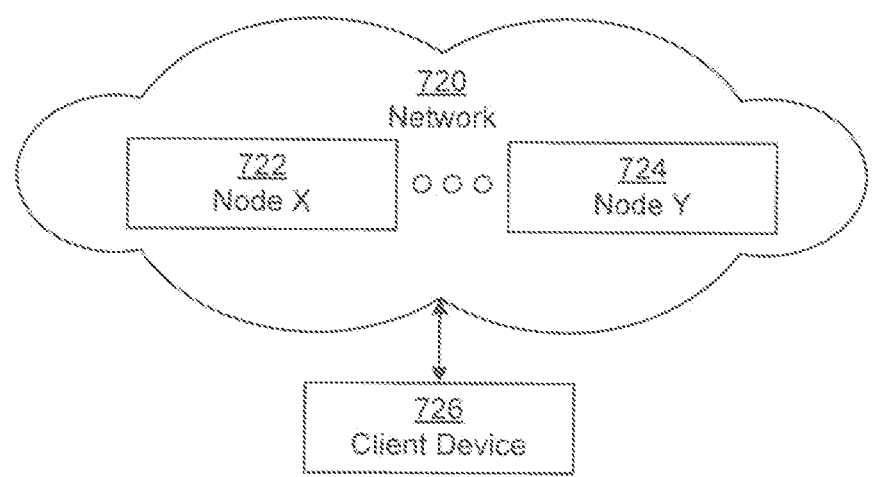
FIG. 7.2

AUTOMATED FILM-MAKING USING IMAGE-BASED OBJECT TRACKING

BACKGROUND

A movie script is a document, typically a work product from a screenwriter, that specifies characters' movements, actions, expressions, and dialogues, as well as sound effects and other settings of a movie film. The movie script may be based on various different formats adopted by the movie industry. A field-of-view (FOV) is an extent of a scene that is imaged by a camera. An object inside the FOV will appear in an image captured and/or outputted by the camera. For example, the FOV may correspond to a solid angle within which a camera lens projects light input to an optical sensor of the camera.

SUMMARY

In general, in one aspect, the invention relates to a method for image capture. The method includes generating, by disposing a light sensing device at one or more locations in a scene, a direction of a visible light source from each of the one or more locations in the scene, generating, based at least on the direction of the visible light source and a pre-determined image capture criterion, a physical configuration of the image capture, wherein the physical configuration comprises at least one selected from a group consisting of a target camera location and a target object location in the scene, and transmitting a command to a camera device to capture an image of an object in the scene based on the physical configuration of the image capture.

In general, in one aspect, the invention relates to an image capture controller. The image capture controller includes a computer processor and memory storing instructions, when executed, causing the computer processor to generate, by disposing a light sensing device at one or more locations in a scene, a direction of a visible light source from each of the one or more locations in the scene, generate, based at least on the direction of the visible light source and a pre-determined image capture criterion, a physical configuration of the image capture, wherein the physical configuration comprises at least one selected from a group consisting of a target camera location and a target object location in the scene, and transmit a command to a camera device to capture an image of an object in the scene based on the physical configuration of the image capture.

In general, in one aspect, the invention relates to a system for image capture. The system includes a light sensing device, a camera device, and an image capture controller configured to generate, by disposing the light sensing device at one or more locations in a scene, a direction of a visible light source from each of the one or more locations in the scene, generate, based at least on the direction of the visible light source and a pre-determined image capture criterion, a physical configuration of the image capture, wherein the physical configuration comprises at least one selected from a group consisting of a target camera location and a target object location in the scene, and transmit a command to a camera device to capture an image of an object in the scene based on the physical configuration of the image capture.

In general, in one aspect, the invention relates to a non-transitory computer readable medium storing instructions for image capture. The instructions, when executed by a computer processor, comprising functionality for generating, by disposing a light sensing device at one or more locations in a scene, a direction of a visible light source from each of the one or more locations in the scene, generating, based at least on the direction of the visible light source and a pre-determined image capture criterion, a physical configuration of the image capture, wherein the physical configuration comprises at least one selected from a group consisting of a target camera location and a target object location in the scene, and transmitting a command to a camera device to capture an image of an object in the scene based on the physical configuration of the image capture.

Other aspects of the invention will be apparent from the following description and the appended claims.

BRIEF DESCRIPTION OF DRAWINGS

FIGS. 1.1, 1.2, and 1.3 show schematic block diagrams of a system in accordance with one or more embodiments of the invention.

FIGS. 2.1 and 2.2 show method flowcharts in accordance with one or more embodiments of the invention.

FIGS. 3.1, 3.2, 4, 5, and 6 show various examples in accordance with one or more embodiments of the invention.

FIGS. 7.1 and 7.2 show a computing system in accordance with one or more embodiments of the invention.

DETAILED DESCRIPTION

Figure 4:
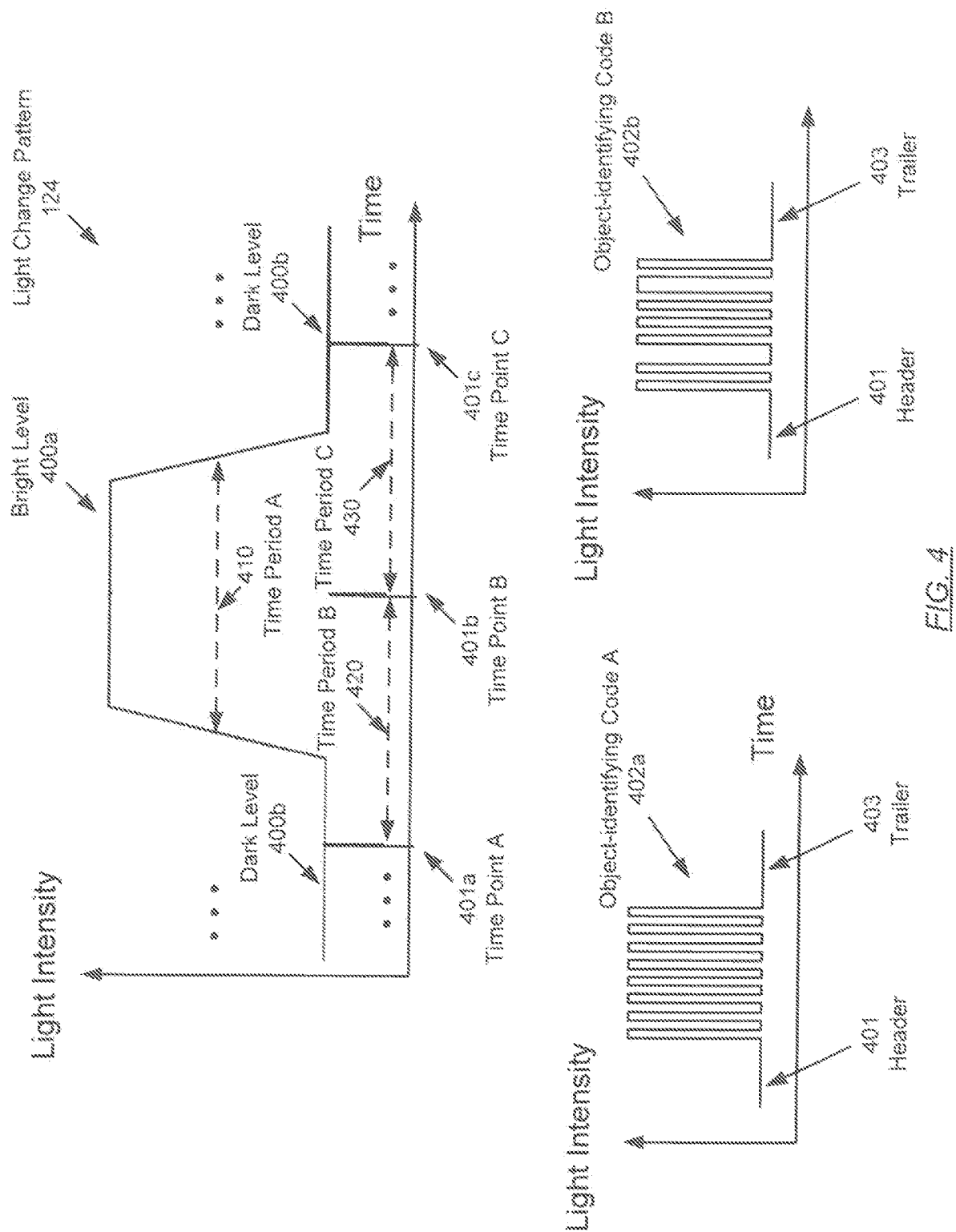

Specific embodiments of the invention will now be described in detail with reference to the accompanying figures. Like elements in the various figures may be denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist. Further, a solid line or a dash line connecting the components of a figure represent a relationship between the connected components. The dash line indicates that the relationship may not include or otherwise associate with any physical connection or physical element.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In one or more embodiments of the invention, a direction of a visible light source from one or more locations in a scene is generated using a light sensing device. A movie script is analyzed to determine pre-determined image capture criteria for image frames of a movie. The image capture criterion of each image frame includes lighting conditions such as front lighting, side lighting, and back lighting, as well as image capture types such as close-up, half-portrait, full-portrait, and wide-angle. While the description herein only illustrates the above lighting conditions and image capture types as examples, other lighting conditions and image capture types may be selected. Based at least on the direction of the visible light source and the image capture criterion, a target camera location and/or a target object location in the scene is generated for each image frame. Accordingly, an image of an object in the scene is captured by a camera device based on the target camera location and/or the target object location. In one or more embodiments, an automated image capture controller uses image-based object tracking technique to generate the target camera location and/or the target object location, as well as to direct the camera device to perform the image capture.

FIG. 1.1 shows a system (100) in accordance with one or more embodiments. In one or more embodiments, one or more of the modules and elements shown in FIG. 1.1 may be omitted, repeated, and/or substituted. Accordingly, embodiments of the invention should not be considered limited to the specific arrangements of modules shown in FIG. 1.1.

As shown in FIG. 1.1, the system (100) includes a camera device (110) having a camera lens (111a) with a field-of-view (FOV) (141), an automated image capture controller (120), a scene (140), object(s) (e.g., object A (142a), object B (142b)) within the scene (140), a visible light source (118), and a light sensing device (112). One or more of the object(s) may appear within the FOV (141), such as the entirety of the object A (142a) or a portion of the object B (142b). A light source is a source of light, which may be visible light or infrared light. The term "light source" may also refer to a corresponding spot produced by the light source in a captured image. The visible light source (118) emits visible light to illuminate the object(s) (e.g., object A (142a), object B (142b)) within the scene (140) such that object images (e.g., photographs, video recordings, etc.) may be captured by the camera device (110). In one or more embodiments, one or more image is captured as a still image or photograph. In one or more embodiments, one or more image is captured as a frame of video recording, for example referred to as an image frame in a movie. The lighting direction (e.g., lighting direction A (119a), lighting direction B (119b)) of a location in the scene (140) is the direction along which visible light emitted from the visible light source (118) illuminates the particular location. The light sensing device (112) is a device that senses the direction of light emitted from the light source, such as from the visible light source (118). For example, the light sensing device (112) may include a complementary-metal-oxide-semiconductor (CMOS) or charge-couple-device (CCD) sensing element mounted on a tilt-and-swivel platform. In one or more embodiments, the tilt-and-swivel platform orients the CMOS or CCD sensing element to detect a direction (i.e., lighting direction A (119a)) of incoming light rays. In one or more embodiments, the visible light source (118) is sufficiently far away from the scene (140) such that the lighting directions everywhere in the scene (140) are parallel to each other. For example, the visible light source (118) may be the natural sun light emitted from the sun such that the lighting direction A (119a) and lighting direction B (119b) are substantially the same direction within the scene (140). In one or more embodiments, the visible light source (118) is near or within the scene (140) such that the lighting directions in the scene (140) are location dependent. In such embodiments, the lighting direction A (119a) and lighting direction B (119b) are substantially different directions within the scene (140).

In one or more embodiments of the invention, the camera device (110) is a device with one or more camera lens (e.g., camera lens (111a)) and associated components (e.g., optical sensor (not shown)) for taking photographs and/or video recordings. A dedicated camera with communication capability is an example of the camera device (110). In one or more embodiments, the camera device (110) is a mobile device, such as a mobile phone with a built-in camera, referred to as a smart phone. A smart phone may have a display with graphical user interface that occupy a large portion (e.g., 70% or larger) of the front surface. The camera lens (111a) may be on the front surface or back surface of the smart phone. In one or more embodiments, the light sensing device (112) is integrated in the camera device (110) and is the same CMOS or CCD sensing element for taking photographs and/or video recordings.

In one or more embodiments, the scene (140) is a place where an action or event, imaged by the camera device (110), occurs. In particular, the action or event may be associated with the object(s) (e.g., object A (142a), object B (142b)). Further, one or more objects may be stationary, moving from time to time, or constantly moving within the scene (140). The field-of-view (FOV) (141) is an extent of the scene (140) that is imaged by the camera device (110) using the camera lens (111a). In other words, an object (e.g., object A (142a)) inside the FOV (140) will appear in an image captured and/or outputted by the camera device (110). For example, the FOV (141) may correspond to a solid angle within which the camera lens (111a) projects light input to the associated optical sensor (not shown) of the camera device (110). In one or more embodiments, the center (141a) of the FOV (140) is aligned with an optical axis (111) of the camera lens (111a). The optical axis (111) is an imaginary line that passes through optical element(s) of the camera lens (111a). In one or more embodiments, the FOV (141) corresponds to different portions of the scene (140) according to how the camera lens (111a) is oriented toward, zoomed with respect to, or otherwise positioned relative to, the scene (140). In one or more embodiments, the object A (142a) may move across the scene (140) during the action or event. Object tracking is the action causing the camera lens (111a) to be oriented toward, zoomed with respect to, or otherwise positioned relative to the scene (140) such that the object A (142a) is continuously within the FOV (141), or at a target position within the FOV (142), during image captures. Generally, the location of an object (e.g., object A (142a)) in the scene corresponds to a position of the object appearing in the FOV (142) or appearing in the captured image. Throughout this disclosure, the terms "object tracking" and "tracking" may be used interchangeably. In one or more embodiments, when the object A (142a) is not at the center (141a) of the FOV (141), the object A (142a) appears off-centered in the image captured by the camera device (110). The position offset (from the center of the image) of the object A (142a) appearing in the image is proportional to the angle between the optical axis (111) and the direction (146) from the camera lens (111a) to the object A (142a) in the FOV (141).

As illuminated by the visible light source (118), the image of an object (e.g., object A (142a)) may be captured under different lighting conditions, such as front lighting, side lighting, and back lighting. The lighting angle is an angle formed between the lighting direction of the object and the direction from the camera lens (111a) to the object. For example, with the object A (142a) at the object location (144a) and the camera device (110) at the camera location (145a), the lighting angle (135) is an obtuse angle denoted as a. Generally, front lighting is illuminating the object by having the camera device (110) and the visible light source (118) located at the same side of the object. In the front lighting condition, the lighting angle is smaller than a pre-determined front lighting threshold, such as 60 degrees. In contrast, back lighting is illuminating the object by having the camera device (110) and the visible light source (118) located at the opposite sides of the object. In the back lighting condition, the lighting angle exceeds a pre-determined back lighting threshold, such as 140 degrees. Side lighting is illuminating the object by having the camera device (110) and the visible light source (118) located at orthogonal sides of the object. In the side lighting condition, the lighting angle is between the pre-determined front lighting threshold and the pre-determined back lighting threshold, such as between 60 degrees and 140 degrees. With the object A (142a) at the object location (144a) and the camera device (110) at the camera location (145a), the lighting angle (135) is an angle between 60 degrees and 140 degrees such that the image of the object A (142a) may be captured by the camera device (110) under the side lighting condition. With the object A (142a) at the target object location (144b) and the camera device (110) at the camera location (145a), the lighting angle would exceeds 140 degrees such that the image of the object A (142a) may be captured by the camera device (110) under the back lighting condition. With the object A (142a) at the object location (144a) and the camera device (110) at the target camera location (145b), the lighting angle would be less than 60 degrees such that the image of the object A (142a) may be captured by the camera device (110) under the front lighting condition. With the visible light source (118) at a fixed location with respect to the scene (140), the image of the object A (142a) may be captured by the camera device (110) under different lighting conditions by moving the object A (142a) and/or the camera device (110) relative to each other and relative to the visible light source (118). Although specific values (i.e., 60 degrees and 140 degrees) of the pre-determined front lighting threshold and the pre-determined back lighting threshold are used in the example above, other values of the pre-determined front lighting threshold and the pre-determined back lighting threshold may also be used. Based on the lighting direction, the pre-determined front lighting threshold, and the pre-determined back lighting threshold, the target camera location may be determined as an angular sector referenced by the current object location to achieve a specified lighting condition. Similarly, the target object location may be determined as an angular sector referenced by the current camera location to achieve a specified lighting condition.

Subject ratio is the fraction (e.g., percentage) of the FOV (141) occupied by a portion of the object appearing within the FOV (141). Accordingly, the subject ratio determines the fraction (e.g., percentage) of the image size occupied by the visible portion of the object appearing in the image. In one or more embodiments, the subject ratio is dependent on the ratio of the focal length of the camera lens (111a) over the distance between the object and the camera lens (111a). For example, as the distance between the object and the camera lens (111a) increases, the subject ratio decreases. Close-up is a type of image capture that tightly frames an object, in particular a person. In the close-up type of image capture, the subject ratio exceeds a pre-determined close-up size threshold, such as 70%. Half-portrait is a type of image capture that tightly frames the upper body of a person. In the half-portrait type of image capture, only the upper body of the subject appears in the half-portrait image with the subject ratio exceeding a pre-determined half-portrait size threshold, such as 60%. Full-portrait is a type of image capture that tightly frames the entire body of a person. In the full-portrait type of image capture, the entire body of the subject appears in the full-portrait image with the subject ratio exceeding a pre-determined full-portrait size threshold, such as 50%. Wide-angle is a type of image capture where the FOV as a solid angle exceeds a pre-determined wide-angle angle threshold, such as 120 degrees. The subject ratio of an object appearing in the wide-angle image is less than a pre-determined wide-angle size threshold, such as 15%. Generally, the image of the object A (142a) may be captured by the camera device (110) with close-up, half-portrait, full-portrait, or wide-angle condition by moving the object A (142a) and/or the camera device (110) relative to each other. Based on the focal length and zoom factor of the camera lens (111a), the target camera location may be determined as a radial distance range referenced by the current object location to achieve a specified image capture type and subject ratio. Similarly, the target object location may be determined as a radial distance range referenced by the current camera location to achieve a specified image capture type and subject ratio. In one or more embodiments, the subject ratio may be determined using an image algorithm that analyzes the pixels occupied by the object in the image based on a model of the object (e.g., a human, a cat, or a dog). The target camera location and/or target object location may be determined based on the desired subject ratio. In one or more embodiments, the image captured by the camera device may be cropped to achieve a specified image capture type and subject ratio of the object, without changing the target camera location and/or target object location. In one or more embodiments, the image captured by the camera device may be cropped to achieve a specified image capture type and subject ratio of the object, along with changing the target camera location and/or target object location.

In one or more embodiments, the movie script may include a machine readable format that specifies, among other information, the lighting condition and subject ratio for one or more image frames of the movie film. For example, the object(s) may be stationery or moving in the image frames. According to the lighting condition and subject ratio specified in each of the image frames, the objects (e.g., object A (142a), object B (142b)) and/or the camera device (110) may be positioned within the scene (140) to generate the image frames.

In one or more embodiments, the automated image capture controller (120) includes a hardware component, a software component, or a combination thereof. In one or more embodiments, the automated image capture controller (120) is configured to generate, based at least on the direction of the visible light source (118) and a pre-determined image capture criterion, a physical configuration of the image capture. In one or more embodiments, the image capture criterion of an image frame specifies the lighting condition, the image capture mode, and the subject ratio of the image to be captured. The physical configuration includes a target camera location and/or a target object location in the scene to capture the image.

In one or more embodiments, the automated image capture controller (120) is further configured to generate control information to direct the objects (e.g., object A (142a), object B (142b)) and/or the camera device (110) to a target camera location and/or a target object location in the scene (140) for image capture. For example, the control information may include, or be used to generate, a visible or audible direction instruction or an electronic control signal. In one or more embodiments, the electronic control signal is a digital data message specifying location or orientation information used by a software application. For example, the digital data message may be transmitted wirelessly. In one or more embodiments, the electronic control signal is an analog electrical signal that triggers hardware to perform relocating or orienting function. For example, the analog electrical signal may be a wireless signal. When the objects (e.g., object A (142a), object B (142b)) and/or the camera device (110) are positioned at the target object location(s) and/or the target camera location, the automated image capture controller (120) sends a signal or command to the camera device (110) to trigger the image capture. In one or more embodiments, the automated image capture controller (120) uses the method described in reference to FIGS. 2.1 and 2.2 below to generate image capture criteria for image frames according to the movie script and to control the camera device to capture the image frames that satisfy corresponding image capture criteria.

Although the system (100) shown in FIG. 1.1 includes only one camera device and one light source, multiple camera devices and multiple light sources may be possible. For example according to the movie script, multiple camera devices may be configured to capture images of a single object simultaneously from different camera locations according to different lighting conditions, different image capture types, and different subject ratios.

FIG. 1.2 shows additional example details of the system (100) depicted in FIG. 1.1 above. In one or more embodiments, one or more of the modules and elements shown in FIG. 1.2 may be omitted, repeated, and/or substituted. Accordingly, embodiments of the invention should not be considered limited to the specific arrangements of modules shown in FIG. 1.2.

As shown in FIG. 1.2, the system (100) includes essentially the same components as depicted in FIG. 1.1 above with the exception of additional components descried below. In particular, the camera device (110) is held by a camera device holder (130) mounted on a moving platform (129). In addition, the light source A (143a) is shown as a reflective infrared (IR) light source attached to the object A (141a). A remote light emitter (114) emits a strobe light A (115) that shines on the reflective light source A (143a) to generate an object reflected light (116). In addition, the light source B (143b) is a local IR light emitter attached to the object B (142b) and emitting a strobe light B (117). The object reflected light (116) and strobe light B (117) are IR light rays captured by an IR sensor (111b) of the camera device (110) via the camera lens (111a) to generate one or more IR images. Throughout this disclosure, the remote light emitter and local light emitter are referred to as light emitters, and the strobe light may be emitted by the remote light emitter or the local light emitter.

In one or more embodiments of the invention, the camera device (110), automated image capture controller (120), camera device holder (130), and moving platform (129) are communicatively coupled to each other. In one or more embodiments of the invention, two or more of the remote light emitter (114), camera device (110), automated image capture controller (120), camera device holder (130), and moving platform (129) are integrated into a single device. For example, at least a portion of the automated image capture controller (120) may be included in the camera device (110). In another example, at least a portion of the automated image capture controller (120) may be included in the camera device holder (130). In still another example, one part of the automated image capture controller (120) is included in the camera device (110) while another part of the automated image capture controller (120) is included in the camera device holder (130). Similarly, the remote light emitter (114) and/or the light sensing device (112) may be integrated with the camera device (110), automated image capture controller (120), or camera device holder (130).

In one or more embodiments, a light emitter (e.g., the remote light emitter (114) or the local light emitter of the light source B (143b)) is any device that emits light. For example, the light emitter may emit light across a large angle (e.g., exceeding 45 degree plane angle, 1 square radian solid angle, etc.) as a flood light emitter. In another example, the light may emit a collimated light beam as a collimated light emitter. The remote light emitter (114) may be separate, e.g., by certain distance such as 1 meter or more, from the object A (142a). In one or more embodiments, the light emitter includes a light-emitting-diode (LED). In one or more embodiments, the strobe light (e.g., strobe light A (115), strobe light B (117)) changes intensity and/or wavelength from time to time. For example, the strobe light may produce a free-running light change pattern according to a particular duty cycle (i.e., a percentage of time when the light pattern has a bright level) and repetition rate (i.e., a number of time the intensity changes during a unit time period). As used herein, light change pattern is a pattern of intensity and/or wavelength change in the light. In one or more embodiments, the light emitter produces a light change pattern with a low repetition rate (e.g., 10 hertz, 20 hertz, etc.) comparing to a frame rate of the camera device (110). The frame rate is a number of images (e.g., a burst of still images or a video recording) captured by the camera device (110) during a unit time. In one or more embodiments, the light emitter produces a light change pattern that is synchronized with the frame rate of the camera device (110). In one or more embodiments, the light emitter emits an IR light. In other words, the strobe light has an infrared wavelength, e.g., between 700 nanometers (nm) and 1 millimeter (mm). Throughout this disclosure, the term "infrared wavelength" refers to a wavelength between 700 nm and 1 mm. In one or more embodiments, the light change pattern produced by the strobe light represents encoded digital data. For example, the encoded digital data produced by an infrared strobe light may be similar to an infrared remote control code.

In one or more embodiments of the invention, the reflective light source A (143a) is a reflective region of the object A (142a) that reflects the strobe light A (115) to generate the object reflected light (116). In this context, the reflective light source A (143a) is said to emit the object reflected light (116). In one or more embodiments, the reflective region has a higher reflectance for infrared wavelength than for visible wavelength. For example, the higher reflectance may be based on reflective material with a higher reflectivity for infrared wavelength than for visible wavelength. While both the strobe light A (115) and ambient light (not shown) shine on the reflective region, the object reflected light (116) may have higher infrared reflected content from the strobe light A (115) than visible reflected content from ambient visible light. In one or more embodiments, the object A (142*a*) is a human, animal, robot, or any other moving item, and the reflective light source A (143*a*) includes a reflective material attached to the object A (142*a*). For example, the reflective material may be part of a wrist band, arm band, belt, finger ring, pendant, necklace, hat, glove, clothing, etc. worn by or otherwise attached to the human, animal, robot, or any other moving item. In one or more embodiments, the reflective material may include metal, dielectric material, or a combination of metal and dielectric material. In one or more embodiments, the reflective material may be a coating layer or painted film on the surface of the aforementioned wrist band, arm band, belt, finger ring, pendant, necklace, hat, glove, clothing, etc. For example, the coating layer or painted film may include infrared reflective pigments such as titanium dioxide. In particular, the titanium dioxide may have a reflectance exceeding 75% for the infrared wavelength.

In one or more embodiments, the reflective material includes a geometric pattern having geometrically varying reflectivity for infrared wavelength to produce a geometric light change pattern. In particular, the geometric pattern of the reflective material produces a spatial variation of the object reflected light that is captured by the camera lens as additional distinction from ambient light. In other words, the geometric pattern enhances the accuracy of detection of the reflective light source. As used herein, geometric light change pattern is a pattern of intensity change in the light according to the geometric pattern. For example, the geometric pattern may be created by surface coating/painting using the aforementioned infrared reflective pigments such as titanium dioxide. In one or more embodiments, the object reflected light (116) from the reflective light source A (143*a*) includes time modulation based on the aforementioned light change pattern originated from the remote light emitter (114) and/or spatial modulation based on the geometric light change pattern of the reflective light source A (143*a*).

In one or more embodiments of the invention, the camera device holder (130) is configured to mechanically hold the camera device (110) and to adjust, in response to a control signal from the automated image capture controller (120), the FOV (141) of the camera lens (111*a*). For example, the camera device holder (130) may include a motorized tilt-and-swivel platform for adjusting a camera angle of the camera lens (111*a*). In another example, the camera device holder (130) may include a motorized horizontal and vertical sliding device for adjusting a position of the camera lens (111*a*) relative to the scene (140). The sliding device may include a mechanical stage for holding and moving the camera device (110). Examples of the camera device holder (130) are described in reference to FIGS. 3.1 and 3.2 below.

In one or more embodiments, the automated image capture controller (120) uses the method described in reference to FIG. 2.2 to perform object tracking based on the light sources attached to the objects (e.g., object A (142*a*), object B (142*b*)). The automated image capture controller (120) is further configured to determine the locations of the objects (e.g., object A (142*a*), object B (142*b*)) based on the object tracking. As described in reference to FIG. 1.1 above, the angle between the optical axis (111) and the direction (146) from the camera lens (111*a*) to the object A (142*a*) may be determined based on the position offset (from the center of the image) of the object A (142*a*) appearing in the captured IR image. In one or more embodiments, the automated image capture controller (120) is configured to analyze the direction of the optical axis (111) and the angle of the object A (142*a*) when the camera device (110) is at different locations. For example with the camera device (110) moved to different locations, the optical axis (111) may be maintained at a fixed direction by the camera device holder (130) based on control information from the automated image capture controller (120). Accordingly, the location of the object A (142*a*) may be determined using triangulation techniques based on the position offsets of the object A (142*a*) appearing in the IR images captured from the different camera locations. In one or more embodiments, the automated image capture controller (120) may determine the location of the object A (142*a*) using methods other than the triangulation. For example, the distance between the object A (142*a*) and the camera device (111*a*) may be determined using a laser range finder or an ultrasonic range finder. Accordingly, the automated image capture controller (120) may determine the location of the object A (142*a*) using the trilateration technique based on distances measured from multiple camera locations.

In one or more embodiments, the automated image capture controller (120) is configured to generate a region-of-interest for tracking the object A (142*a*). In one or more embodiments, the region-of-interest is generated based on a dynamic model of the object A (142*a*) and the location of the light source A (143*a*) in a captured IR image. For the example where the object A (142*a*) is a human, the dynamic model describes mechanical linkages among movable elements (e.g., arm, wrist, hand, head, torso, leg, etc.) of the human body. The dynamic model takes into account possible postures of the human body. For example considering that the light source A (143*a*) is attached to a particular movable element (e.g., wrist) of the human body, a range limitation of other movable elements (e.g., arm, hand, head, torso, leg, etc.) relative to the particular movable element (e.g., wrist) may be determined based on the dynamic model to generate a probability map representing the region-of-interest where the human body may appear in the scene (140). The region-of-interest may facilitate the calculation of an exact structure of the object in a limited area (ie., within the region-of-interest) in the image, which may reduce the requirement of computing resources significantly. Accordingly, the distance between the object A (142*a*) and the camera device (110) to satisfy a particular image capture type (e.g., close-up, half-portrait, full-portrait, and wide-angle) may be determined based on the size of the object appears in the image and the solid angle of the FOV (141), which is dependent on the focal length and zoom factor of the camera lens (111*a*). In one or more embodiments, the automated image capture controller (120) is configured to determine the distance satisfy the image capture type specified by the movie script based on the region-of-interest and the focal length and zoom factor of the camera lens (111*a*). Accordingly, the distance is used in determining the target camera location and/or the target object location based on the current object location and/or current camera location according to the movie script. In one or more embodiments, the automated image capture controller (120) is configured to determine the subject ratio of the object appears in the image. Accordingly, the subject ratio is used in determining the target camera location and/or the target object location based on the current object location and/or current camera location according to the movie script.

In one or more embodiments of the invention, the moving platform (129) is a carrier that moves about within and/or beyond the scene (140) according to the control information generated by the automated image capture controller (120). In one or more embodiments, the moving platform (129) is a robot, a motorized cart, or a drone that holds the camera device (110) and driven by a location control signal to move to the target camera location.

In one or more embodiments, the moving platform (129) is a human user holding the camera device (110). The control information from the automated image capture controller (120) is outputted by the camera device (110) as an instruction directing the human user to move to the target camera location.

In one or more embodiments, the objects (e.g., object A (142a), object B (142b)) may include a human object, such as a movie actor. In such embodiments, the control information from the automated image capture controller (120) may include an instruction directing the human object to move to the target object location.

Although the light sources shown in FIG. 1.2 include both a local light emitter and a reflective light source, other configurations may also be possible where only local light emitters or only reflective light sources are used. For example, both light source A (143a) and light source B (143b) may be local light emitters. In another example, both light source A (143a) and light source B (143b) may be reflective light sources shone by a single remote light emitter (114).

Although the system (100) shown in FIG. 1.2 includes only one camera device and camera device holder, multiple camera devices and multiple camera device holders may be possible. For example, multiple camera devices may be configured to track different objects with different encoded light sources simultaneously without conflict.

FIG. 1.3 shows details of the automated image capture controller (120) in accordance with one or more embodiments. The following description of FIG. 1.3 refers to various components depicted in FIGS. 1.1 and 1.2 above. In one or more embodiments, one or more of the modules and elements shown in FIG. 1.3 may be omitted, repeated, and/or substituted. Accordingly, embodiments of the invention should not be considered limited to the specific arrangements of modules shown in FIG. 1.3.

As shown in FIG. 1.3, the automated image capture controller (120) includes a hardware processor (121), memory (122), and repository (123). In one or more embodiments of the invention, the hardware processor (121) corresponds to the computer processors (702) depicted in FIG. 7.1 below. Similarly, the memory (122) and repository (123) correspond to the non-persistent storage (704) and/or persistent storage (706) depicted in FIG. 7.1 below. For example, the memory (122) may store software instructions that, when executed, cause the hardware processor (121) to perform image capture and object tracking functionalities of the automated image capture controller (120). In one or more embodiments, the automated image capture controller (120) performs various functionalities according to the method flowcharts described in reference to FIGS. 2.1 and 2.2 below. In one or more embodiments, the memory (122) stores instructions to perform one or more portions of the method flowcharts described in reference to FIGS. 2.1 and 2.2 below. In one or more embodiments, the automated image capture controller (120) and the camera device (110) are integrated into a single device. In such embodiments, the instructions to perform one or more portions of the method flowcharts described in reference to FIGS. 2.1 and 2.2 are part of a mobile application, or mobile app, which is a user-installable software application designed to run on a smart phone or other mobile devices.

Further as shown in FIG. 1.3, the repository (123) includes a sequence of IR images (126), a light change pattern (124), a displacement (125), a movement parameter (128), and a target position (127). In particular, the sequence of IR images (126) includes consecutive images (e.g., IR image A (126a)) captured by the camera device (110). For example, the IR image A (126a) corresponds to a portion of the scene (140) that is covered by the FOV (141) at a particular time point. The light change pattern (124) is a pattern of light intensity and/or wavelength alternating between different intensity levels and/or wavelengths across the sequence of images (126).

In one or more embodiments, the light change pattern (124) corresponds to a spot in each IR image of the sequence of IR images (126). For example, the spot may be defined by a pixel position or a collection of connected pixel positions in each IR image. In this context, the light change pattern (124) is referred to as a local light change pattern captured by the camera device (110). In one or more embodiments, the light change pattern (124) is caused by a strobe light (e.g., strobe light A (115), strobe light B (117)) and indicates a position of the light source (e.g., light source A (143a), light source B (143b)) within each IR image. In other words, the position of the light source (e.g., light source A (143a), light source B (143b)) within each IR image may be determined based on where the light change pattern (124) is found across the sequence of IR images (126). For example, the light change pattern (124) indicates that the light source is at the position A (127a) in the IR image A (126a). Similarly, each other IR image in the sequence of IR images (126) is associated with a position of the light source. The target position (127) is a pre-determined position that the automated image capture controller (120) is configured for tracking the object (e.g., object A (142a), object B (142b)). For example, the target position (127) may be defined as the center of the FOV (141), which corresponds to the center of each IR image of the sequence of IR images (126). In other words, the automated image capture controller (120) is configured to adjust the FOV (141) such that the tracked object appears at the center (i.e., target position (127)) in the IR image after the adjustment. In other examples, the target position (127) may be defined as different positions from the center of the FOV (141). The displacement (125) is the position offset between the target position (127) and the position (e.g., position A (127a)) of the light source within an IR image. In one or more embodiments, the displacement (125) includes a horizontal distance and a vertical distance. The displacement (125) may be represented based on a number of pixels or any other suitable distance scale. In one or more embodiments, the object may be a moving object such that the position (e.g., position A (127a)) of the light source may vary from one image to next in the sequence of images (126). In such embodiments, the movement parameter (128) is a rate of change of the position (e.g., position A (127a)) of the light source over time. For example, the movement parameter (128) may include a change in the position (e.g., position A (127a)) of the light source from one image to next in the sequence of images (126). Depending on the moving direction of the tracked object, the movement parameter (128) may include a horizontal portion and a vertical portion. Mathematically, the movement parameter (128) corresponds to a derivative of the displacement (125) over time.

In one or more embodiments, light change pattern (124) includes a light intensity change and/or a light wavelength change. In particular, the light intensity change and/or light wavelength change is associated with a repetition rate of the change. In one or more embodiments, the light intensity change and/or light wavelength change with associated repetition rate defines a digital code. For example, the digital code may include a header and subsequent digital pattern where the header and subsequent digital pattern may be re-occurring within the light change pattern (124). The digital code may be distinct for each light source in the scene (140) and used for identifying the object attached with the light source. In this context, the digital code defined by the light intensity change and/or light wavelength change with associated repetition rate of the light change pattern (124) is referred to as an object-identifying code (124a). In one or more embodiments, the light intensity change and/or a light wavelength change are temporal change produced by the light emitter. In one or more embodiments, the light intensity change and/or a light wavelength change further include spatial change produced by the aforementioned geometric pattern of a reflective light source.

In one or more embodiments, the automated image capture controller (120) performs the FOV adjustment functionalities based on the sequence of images (126), light change pattern (124), displacement (125), movement parameter (128), and target position (127) described above. Specifically, the automated image capture controller (120) performs the FOV adjustment functionalities using the method described in reference to FIG. 2 below. An example of the sequence of images (126), light change pattern (124), object-identifying code (124a), displacement (125), and movement parameter (128) is described in reference to FIGS. 4-6 below.

FIG. 2.1 shows a flowchart in accordance with one or more embodiments. The process shown in FIG. 2.1 may be executed, for example, by one or more components discussed above in reference to FIGS. 1.1, 1.2, and 1.3. One or more steps shown in FIG. 2.1 may be omitted, repeated, and/or performed in a different order among different embodiments of the invention. Accordingly, embodiments of the invention should not be considered limited to the specific number and arrangement of steps shown in FIG. 2.1.

Initially, in Step 241, a direction of a visible light source from a location in the scene is generated. In one or more embodiments of the invention, a light sensing device is placed at one or more locations in the scene to determine the direction of the visible light source from each location. In one or more embodiments, the light sensing device is a visible light sensor embedded in a camera device. With the camera device located at a particular location and the visible light sensor oriented toward various directions, the visible light sensor is used to capture a number of images corresponding to these directions. Each image is a portion of a photo sphere centered at the location of the camera device, or more specifically centered at the location of the visible light sensor. The captured images are analyzed using a hardware processor to select an image where the visible light source appears. If the visible light source appears in multiple images, the image having the visible light source closest to the center of the image is selected. Accordingly, the direction of the visible light sensor corresponding to the selected image is determined as representing the direction of the visible light source, i.e., the lighting direction at the location where the light sensing device is placed.

In one or more embodiments, the visible light source (e.g., natural sun light from the sun) is sufficiently far away from the scene such that the lighting directions everywhere in the scene are parallel to each other. In such embodiments, the lighting direction throughout the scene may be determined as described above by placing the light sensing device at any single location in the scene. In one or more embodiments, the visible light source is near or within the scene such that the lighting directions in the scene are location dependent. In such embodiments, the light sensing device may be placed at two or more locations in the scene where two or more lighting directions are determined as described above. The location of the visible light source may be mathematically derived using triangulation based on the two or more directly determined lighting directions. Accordingly, the lighting direction at any particular location in the scene is the direction from the mathematically derived location of the visible light source to the particular location in the scene. In other words, the lighting direction at the particular location may be determined without placing the light sensing device at the particular location.

In Step 242, a movie script is analyzed to determine an image capture criterion of an image in a movie. In one or more embodiments of the invention, the image capture criterion specifies a lighting condition and an image capture type of an object in the image. Accordingly, the movie script is analyzed to determine one of front lighting, side lighting, and back lighting of the object in the particular image. In addition, the movie script is analyzed to determine one of close-up, half-portrait, full-portrait, and wide-angle image capture type for the particular image. In one or more embodiments, the movie script is in a machine readable format and is analyzed by a computer processor. The target position and subject ratio in the particular image is also determined for each of the image capture type based on the movie script. In one or more embodiments, the object in the scene includes multiple actors such as a main character and a supporting character. In one or more embodiments, the actors may be human, animal, robot, or any other moving item. In such embodiments, the movie script is further analyzed to identify which of the main character and the supporting character that the lighting condition and image capture type pertain to.

In Step 243, a target camera location and/or a target object location is generated based on the lighting direction of the scene and the specified lighting condition and image capture type for the particular image. In one or more embodiments, the object is stationery in the particular image and the target camera location is generated to satisfy the specified lighting condition and image capture type for the particular image. For example, the target camera location may be determined to be within certain angular sector with respect to the stationery object location based on the specified lighting condition. Further, the target camera location may be determined to be within certain radial distance range with respect to the stationery object location based on the specified subject ratio. Accordingly, the target camera location may be determined based on the intersection of the angular sector and the radial distance range determined above. The target camera location may be further determined based on additional constraints, such as to minimize the distance between the current camera location and the target camera location or to avoid obstruction between the target camera location and the stationery object location. In one or more embodiments, the stationery object location is determined using the method described in reference to FIG. 2.2 below.

In one or more embodiments, the camera device is stationery at a pre-determined location for the particular image and the target object location is generated to satisfy the specified lighting condition and image capture type for the particular image. For example, the target object location may be determined to be within certain angular sector with respect to the stationery camera location based on the specified lighting condition. Further, the target object location may be determined to be within certain radial distance range with respect to the stationery camera location based on the specified subject ratio. Accordingly, the target object location may be determined based on the intersection of the angular sector and the radial distance range determined above. The target object location may be further determined based on additional constraints, such as to minimize the distance between the current object location and the target object location or to avoid obstruction between the target object location and the stationery camera location. In one or more embodiments, the current object location is determined using the method described in reference to FIG. 2.2 below.

In one or more embodiments, the object in the scene includes multiple actors such as a main character and a supporting character. In one or more embodiments, the actors may be human, animal, robot, or any other moving item. In such embodiments, the target camera location and/or the target object location is generated pertaining to either the main character or the supporting character for the particular image according to the movie script. In one or more embodiments, the main character or the supporting character are tracked using the method described in reference to FIG. 2.2 below.

In Step 244, the camera device and/or the object is directed to the corresponding target location determined in Step 243 above. For example, directing the camera device and/or the object to the corresponding target location may be by way of automatically controlling a robotic platform or by automatically generating audible/visible instructions to a human holding the camera device and/or the object. In one or more embodiments, the object is stationary in the particular image and the camera device is directed to the target camera location to satisfy the specified lighting condition and image capture type for the particular image. In one or more embodiments, the camera device is disposed on a moving platform. In such embodiments, a location control signal is generated to direct a moving platform to move to the target camera location.

In one or more embodiments, the moving platform is a robotic platform holding the camera device and driven by the location control signal to move to the target camera location. In one or more embodiments, the moving platform is a human user holding the camera device, where the location control signal causes the camera device to output an instruction directing the human user to move to the target camera location.

In one or more embodiments, the camera device is stationery in the particular image and the object is directed to the target camera location to satisfy the specified lighting condition and image capture type for the particular image. In one or more embodiments, the object is a human actor and an instruction is generated directing the human actor to move to the target camera location. For example, the instruction may be a visible message or an audio message.

In Step 245, the image capture criterion is verified upon the camera device and/or the object arriving the corresponding target location. In one or more embodiments, a measure of lighting of the object is captured using the light sensing device to confirm that the specified lighting condition is satisfied. For example, the measure of lighting may include the lighting direction and/or contrast of the object measured using the light sensing device at the location of the camera device. In one or more embodiments, verifying the image capture criterion is optional. In such embodiments, verifying the image capture criterion may not be performed.

In Step 246, an image of the object in the scene is caused to be captured by the camera device based on the verified image capture criterion. For example, a command may be transmitted to a camera device to capture the image. As noted above, in one or more embodiments, verifying the image capture criterion is optional and an image of the object in the scene may be captured by the camera device without verifying the image capture criterion. In one or more embodiments, the image of the object is captured using the method described in reference to FIG. 2.2 below.

As noted above, in one or more embodiments, the light sensing device is the sole image sensor of the camera device. In such embodiments, the light sensing device used to determine the lighting direction and verify the image capture criterion is the same image sensor that is used to capture the image of the object.

In one or more embodiments, control information is generated to change a field-of-view of the camera device to capture the image such that the object appears in the image to substantially align with a target position within the field-of-view of the camera device. In one or more embodiments, the control information includes camera orientation and/or zoom factor. For example, the control information may be used to further generate an orientation control signal to orient the field-of-view of the camera device toward the object from the target camera location. In another example, the control information may be used to further generate a zoom control signal to adjust the camera device.

In one or more embodiments, control information is generated to change a crop field of the image such that the object appears in the image to substantially align with a target position within the crop field of the image. In one or more embodiments, the control information specifies a cropping region within the image. For example, the control information may be used during post production phase of the movie making.

In Step 247, a determination is made as to whether another image is to be captured according to the movie script. If the determination indicates to continue capturing another image, the method returns to Step 242. If the determination indicates that no more image is to be captured, the method ends.

FIG. 2.2 shows a flowchart in accordance with one or more embodiments. The process shown in FIG. 2.2 may be executed, for example, by one or more components discussed above in reference to FIGS. 1.1, 1.2, and 1.3. One or more steps shown in FIG. 2.2 may be omitted, repeated, and/or performed in a different order among different embodiments of the invention. Accordingly, embodiments of the invention should not be considered limited to the specific number and arrangement of steps shown in FIG. 2.2.

Initially, in Step 251, a light source within a scene is activated. In one or more embodiments of the invention, the light source is a reflective region attached to an object in the scene. In such embodiments, the reflective light source is activated by using a remote light emitter to emit and project a strobe light onto the reflective region. For example, the strobe light is emitted with a free-running light pattern when the remote light emitter is turned on. As a result, the strobe light is reflected by the reflective region to generate an object reflected light having the same free-running light pattern. In one or more embodiments of the invention, the light source is a local light emitter attached to an object in the scene. In such embodiments, the light source is activated by activating the local light emitter to emit a strobe light. For example, the strobe light is emitted with a free-running light pattern when the local light emitter is turned on.

In one or more embodiments, the strobe light and the object reflected light have a low repetition rate (e.g., 10 hertz, 20 hertz, etc.) comparing to a frame rate of a camera device. In one or more embodiments, the strobe light and the object reflected light are synchronized with the frame rate of the camera device. For example, the strobe light may be initiated and/or synchronized based on a trigger signal sent from a tracking controller and/or the camera device. In one or more embodiments, intensity and/or wavelength of the strobe light and/or the object reflected light are changed with associated repetition rate(s) to define the object-identifying code.

In Step 252, a sequence of images of the scene is captured by a camera device. In particular, the object is within the field-of-view (FOV) of the camera lens and appears in the sequence of images. For example, the sequence of images may include or be part of a burst of still images. In another example, the sequence of images may include or be part of a video recording. In one or more embodiments, the sequence of images of the scene is captured while the light source emits the object reflected light or strobe light. In one or more embodiments, the frame rate of the sequence of images is selected based on the duty cycle and/or repetition rate of the light source such that consecutive images (or a pair of images with a particular separation in the sequence) include alternating bright level and dark level, and/or alternating wavelengths from the light emitter. For example, the remote or local light emitter may be free running and the frame rate is selected based on the duty cycle and/or repetition rate of the free running light source. In one or more embodiments, the duty cycle and/or repetition rate of the light emitter is selected based on the frame rate of the sequence of images such that consecutive images (or a pair of images with a particular separation in the sequence) include alternating bright level and dark level, and/or alternating wavelengths from the light emitter. For example, the frame rate may be pre-determined and the light emitter is synchronized to the frame rate, e.g., based on a trigger signal from the camera device.

In Step 253, based on a local light change pattern across the sequence of images, the light source is detected in the scene. Specifically, the object reflected light or strobe light from the light source causes changes in light intensity and/or wavelength received by an optical sensor of the camera device resulting in the local light change pattern across the sequence of images. In one or more embodiments, the intensity of the light source is adjusted to control the size where the local light change pattern is found in each image. For example, the size may be limited to a percentage (e.g., 1%, 3%, etc.) of the horizontal and vertical dimensions of the FOV. In one or more embodiments, the position and the size of the detected light source are defined where the difference in alternating bright level and dark level, and/or alternating wavelengths, in consecutive images, as recognized by the optical sensor of the camera device, exceeds a pre-determined threshold.

In one or more embodiments, a pair of images in the sequence of images are compared by subtraction of intensity and/or wavelength values of corresponding pixels. Specifically, the intensity and/or wavelength values are generated by the optical sensor. For example, the intensity values may correspond to pixel output values of a monochrome CMOS (complementary metal oxide semiconductor) sensor. In another example, output values of RGB CMOS sensor may be analyzed to determine the wavelength value of each pixel. In particular, the intensity and/or wavelength value of a pixel in one image is subtracted from the intensity and/or wavelength value of the corresponding pixel in another image to generate a subtraction result. The pixel where the difference in alternating bright level and dark level, and/or alternating wavelengths, is found in the subtraction result is selected as part of the detected light source in the image. Depending on the duty cycle/repetition rate of the light source versus the frame rate of the sequence of images, the pair of images may be consecutive images or two images separated by a particular number of images, such as every three images, etc.

In one or more embodiments, an object-identifying code is extracted from the local light change pattern to identify the light source from multiple light sources within the scene. In one or more embodiments, the local light change pattern is analyzed to detect a pre-determined header pattern. Once detected, the pattern following the pre-determined header pattern is extracted as the distinct code identifying a particular light source or object. In one or more embodiments, the distinct code has a pre-determined length or number of digital bits that is used to de-limit the object-identifying code. In other embodiments, the object-identifying code may be de-limited based on other criteria.

In one or more embodiments, multiple objects (e.g., a main character and a supporting character according to the movie script) within the scene are tracked con-currently where each object is attached with an individual light source with distinct object-identifying code. In other words, multiple light change patterns are found at multiple locations across the sequence of images where each light change pattern includes a distinct object-identifying code that is different from any object-identifying code of other light change pattern. Accordingly, each light source is identified as distinct from other light sources based on respective light change patterns. Because each light source is uniquely associated with the object it is attached, each object is tracked individually across the sequence of images based on respective object-identifying codes.

In one or more embodiments, multiple light sources are detected and identified by iterating Steps 252 through 254. For example, each iteration may be based on a particular object-identifying code specified by a user input. In one or more embodiments, an image from the sequence of images is presented to a user interface window where a user may select an object by clicking or otherwise selecting one of multiple detected light sources. Once selected, the object-identifying code of the selected light source is used to determined the location of the selected light source corresponding to the selected object. Accordingly, the selected object is tracked for image capturing in Steps 255 through 259. From time to time, the user may select a different object using the user interface, once the tracked object is switched to a different object, a different object-identifying code of the newly selected light source is used to determined the location of the newly selected light source corresponding to the newly selected object. Accordingly, the newly selected object is tracked for image capturing in Steps 255 through 259.

In Step 254, the sequence of images is analyzed to determine a position of the detected and identified light source in at least one image, and optionally a movement of the light source across the sequence of images. In one or more embodiments, the position of the light source is determined based on where the difference in alternating bright level and dark level, and/or alternating wavelengths in the sequence of images, as recognized by the optical sensor of the camera device, exceeds the pre-determined threshold.

In one or more embodiments, the movement of the light source is determined based on a rate of change of the location over the sequence of images.

In Step 255, a determination is made as to whether to change the camera location. In one or more embodiments, the camera location is changed to perform triangulation to determine the location of the object in the scene. If the determination is positive, i.e., the camera location is to be changed for performing triangulation, the method returns to Step 252 with the camera device moved to a different location. If the determination negative, i.e., the camera location is not to be changed, the method proceeds to Step 256.

In Step 256, the position of the light source is analyzed to generate a result. In one or more embodiments, the position of the light source and a target position within an image are compared to generate the result. In one or more embodiments, the result includes the displacement between the light source position and the target position. In one or more embodiments, the displacement may vary from one image to next in the sequence of images, indicating that the object is a moving object. In such embodiments, the rate of change of the displacement over time, e.g., from one image to next, is computed as a movement parameter. In one or more embodiments, the displacement between the light source position and the target position, and optionally the movement parameter, are used to generate the control information for object tracking during image capture.

In one or more embodiments where triangulation is performed, the position offset (from the center of the image) of the light source appearing in the image is proportional to the angle between the optical axis of the camera device and the direction from the camera lens to the object in the scene. Based on the position offsets of the light source appearing in two or more images captured by the camera device at different locations, the location of the object in the scene is determined using a triangulation survey technique. In one or more embodiments, satisfying the lighting condition and image capture type specified in the movie script is based on determining the location of the object in the scene as described above.

In Step 257, control information is generated based on the result. In one or more embodiments, control information is generated to change a field-of-view of the camera device to capture the image such that the object appears in the image to substantially align with a target position within the field-of-view of the camera device. In one or more embodiments, the control information includes camera orientation and/or zoom factor. For example, the control information may be used to further generate an orientation control signal to orient the field-of-view of the camera device toward the object from the target camera location. In another example, the control information may be used to further generate a zoom control signal to adjust the camera device.

In one or more embodiments, control information is generated to change a crop field of the image such that the object appears in the image to substantially align with a target position within the crop field of the image. In one or more embodiments, the control information specifies a cropping region within the image. For example, the control information may be used during post production phase of the movie making.

In Step 258, a control signal is sent to a camera device holder (e.g., a camera handheld grip, a tilt-and-swivel device, etc.) where the camera device is mounted. Accordingly, the orientation of the camera lens or a relative position of the camera device is adjusted in the opposite direction to the displacement.

In one or more embodiments, the control signal is generated based on the control information of Step 257. In one or more embodiments, the control signal is configured to adjust the orientation of the camera lens in the opposite direction to the displacement. In one or more embodiments, the control signal is configured to adjust the relative position of the camera with respect to the scene in the opposite direction to the displacement. In one or more embodiments, the movement parameter is considered in fine tuning the amount of adjustment caused by the control signal.

In Step 259, a substantial alignment between the target position and the light source is detected within the FOV of the camera device. In particular, the substantial alignment is a result of adjusting the orientation of the camera lens or a relative position of the camera device in the opposite direction to the displacement.

In Step 260, in response to detecting the substantial alignment, an image of the scene is captured according to the movie script. In one or more embodiments, a signal or command is sent to the camera device to trigger the image capture. In one or more embodiments, consecutive images are continuously captured and outputted by the camera device at a regular repetition rate (i.e., frame rate). In such embodiments, the sequence of images that is analyzed to generate the control signal is limited to a rolling time window (e.g., a rolling sequence of 2 consecutive images, 5 consecutive images, 10 consecutive images, etc.) that precedes the image captured according to the movie script.

In one or more embodiments, the sequence of images that is analyzed to generate the control signal is designated as control information without being outputted by the camera device. In contrast, the image where the light source (hence the object) substantially aligns with the target position is outputted by the camera device to be part of the movie. For example, the control information may be stored separately from the movie images until being discarded or otherwise removed from the camera device.

In Step 261, a determination is made as to whether image capturing is to continue at the current camera location. If the determination is positive, i.e., the image capturing is to continue with the camera at the current camera location, the method proceeds to Step 252. If the determination is negative, i.e., the image capturing is not to continue, the method ends.

FIGS. 3.1, 3.2, 4, 5, and 6 show various examples in accordance with one or more embodiments of the invention. The examples shown in FIGS. 3.1, 3.2, 4, 5, and 6 may be, for example, based on one or more components depicted in FIGS. 1.1, 1.2, and 1.3 above and the method flowcharts depicted in FIGS. 2.1 and 2.2 above. In one or more embodiments, one or more of the modules and elements shown in FIGS. 3.1, 3.2, 4, 5, and 6 may be omitted, repeated, and/or substituted. Accordingly, embodiments of the invention should not be considered limited to the specific arrangements of modules shown in FIGS. 3.1, 3.2, 4, 5, and 6.

FIG. 3.1 shows a camera mobile device handheld grip (800) as an example of the camera device holder (130) depicted in FIG. 1.2 above. In addition, a camera mobile device (201) (e.g., a smart phone having a camera lens (220)), mechanically held by the camera mobile device handheld grip (800), is an example of the camera device (110) depicted in FIG. 1.2 above. Further, the camera lens (220) is an example of the camera lens (111a) depicted in FIG. 1.2 above. In one or more embodiments, the IR sensor (112b) and the light sensing device (112) depicted in FIG. 1.2 above are integrated with a CMOS or CCD sensing element associated with the camera lens (111a) for taking photographs and/or video recordings by the camera mobile device (110). Correspondingly, for taking photographs and/or video recordings by the camera mobile device (201), the camera lens (220) is associated with a CMOS or CCD sensing element that is an example of integrated IR sensor (112b) and light sensing device (112) depicted in FIG. 1.2 above.

In one or more embodiments of the invention, the camera mobile device handheld grip (800) is an electro-mechanical assembly that includes a holder (221), a tilting shaft (203), an tilting motor (213), a rotating shaft (209), a rotating motor (219), and a handheld grip (222). The holder (221) is configured to mechanically hold the camera mobile device (201) and mechanically couple to the tilting shaft (203). The handheld grip (222) is configured to maintain, while being handheld by a viewer, mechanical stability of the camera mobile device handheld grip (800). Although not explicitly shown, the handheld grip (222) includes a communication interface configured to communicate with the camera device (110) and/or the automated image capture controller (120) depicted in FIG. 1.2 above. For example, the communication interface may be based on Bluetooth, NFC, USB, or other wireless/wired communication interfaces. In one or more embodiments, the rotating shaft (209) is rotatable around a rotating axis (209-1) by the rotating motor (219) in response to a control signal received from the automated image capture controller (120) via the communication interface. Similarly, the tilting shaft (203) is rotatable by the tilting motor (213) around a tilting axis (203-1) in response to the control signal received from the automated image capture controller (120) via the communication interface. In response to tilting the holder (221) around the tilting axis (203-1) and/or rotating the holder (221), collectively with the tilting shaft (203) and tilting motor (213), around the rotating axis (209-1), the orientation of the camera lens (220) may be adjusted. Accordingly, the FOV (220-1) of the camera lens (220) is adjusted according to the orientation of the camera lens (220). Although the example shown in FIG. 3.1 is based on two motors associated with two mechanical shafts, other examples may be based on three motors associated with three mechanical shafts without departing from the scope of the invention wherein the third motor may be an additional rotating motor, such as the additional rotating motor (331) with the additional rotating axis (209-2) shown in FIG. 3.2. Specifically, FIG. 3.2 shows a camera mobile device handheld grip (800) with three motors as an example of the camera device holder (130) depicted in FIG. 1.2 above.

FIG. 4 shows an example of the light change pattern (124) of the light source (e.g., light source A (143a), light source B (143b)) depicted in FIGS. 1.1 and 1.2 above. As shown in FIG. 4, the horizontal axis corresponds to time and the vertical axis corresponds to light intensity. In particular, the light change pattern (124) is a pattern of light intensity alternating between a bright level (400a) and a dark level (400b) over time. For example, the bright level (400a) of the light intensity sustains over a time period A (410) and may be recurring over time with certain repetition rate. While the light intensity alternates between the bright level (400a) and the dark level (400b) over time, a sequence of IR images is captured by a camera device periodically. For example, consecutive IR images in the sequence may be captured at a time point A (401a), time point B (401b), time point C (401c), etc. that are separate from each other by a time period B (420), time period C (430), etc. In particular, the time period A (410) encompasses at least one image capture time point, such as the time point B (401b). The alternating sequence of dark level (400b) captured at time point A (401a), bright level (400a) captured at time point B (401b), dark level (400b) captured at time point C (401c), etc. forms the aforementioned local light change pattern captured by the camera device. Although the light change pattern (124) depicted in FIG. 4 is a pattern of light intensity changes, the light change pattern (124) may also include wavelength changes in other examples. In other words, the bright level (400a) and dark level (400b) may be substituted or supplemented by different wavelengths to represent wavelength changes.

The light change pattern (124) depicted in FIG. 4 may be extended along the time axis across a sequence of time points and IR images to define an object-identifying code. For example, the object-identifying code A (402a) and object-identifying code B (402b) are shown in FIG. 4 below the light change pattern (124) using a different time scale. In one or more embodiments, the light intensity level and/or wavelength value in each IR image defines a digital data bit. In other embodiments, the light intensity level and/or wavelength value is constant across each of a number of recurring sets of IR images where each IR image set corresponds to a digital data bit. In other words, a digital data bit may correspond to a single IR image or an IR image set. In each of the object-identifying code A (402a) and object-identifying code B (402b), a distinct digital data bit pattern is delimited by a header (401) and a trailer (403). For example, the header (401) and trailer (403) may each contain 8 consecutive "zero" digital data bits. Inserted between the header (401) and trailer (403), the object-identifying code A (402a) includes a digital data bit pattern of "1010101010101010" while the object-identifying code B (402b) includes a digital data bit pattern of "1010010101011010". Accordingly, the digital data bit pattern of "1010101010101010" and the digital data bit pattern of "1010010101011010" are used to identify or select two distinct light sources attached to two distinct objects within the scene (140) depicted in FIGS. 1.1 and 1.2 above.

Figure 5:
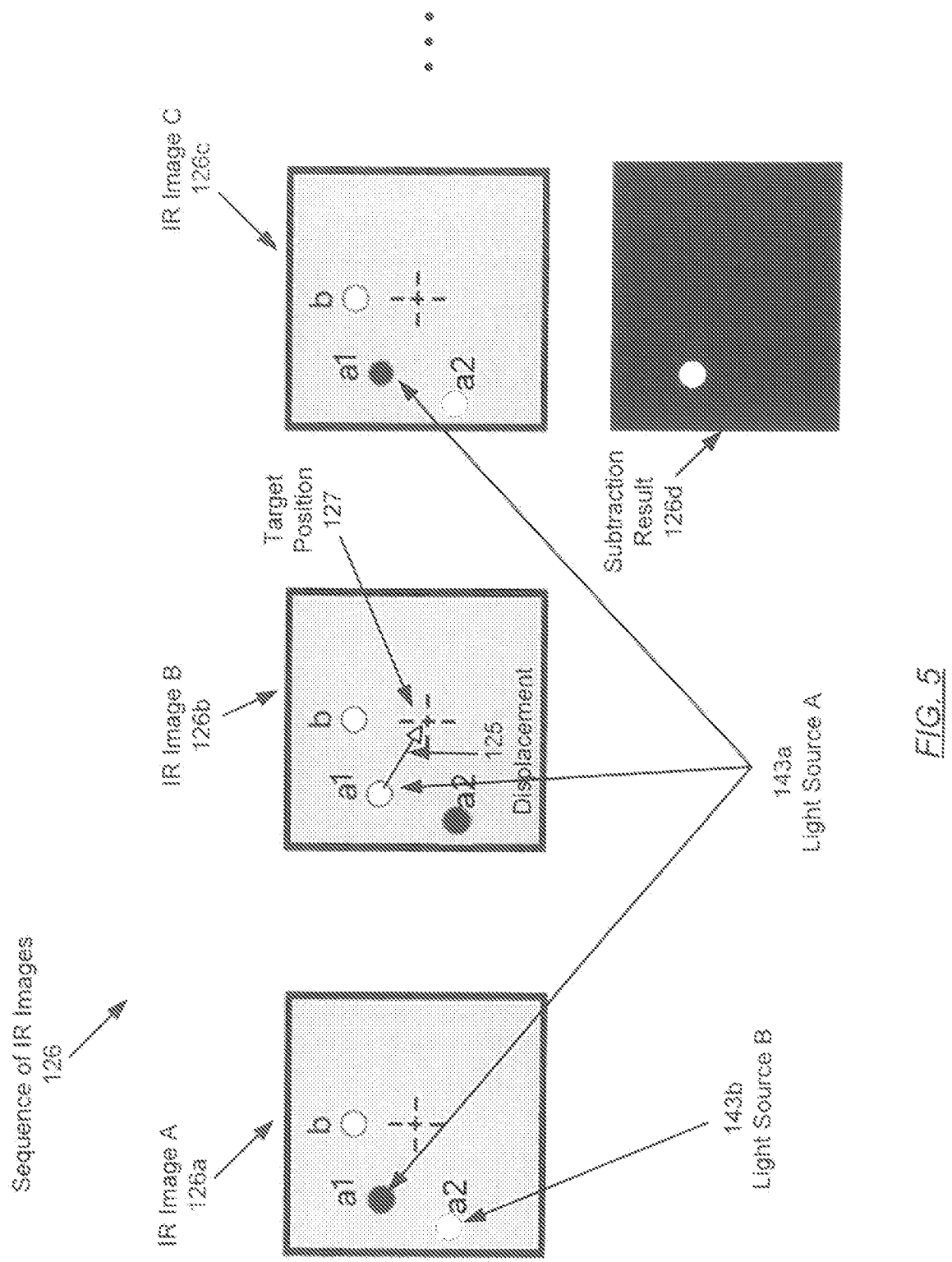

FIG. 5 shows an example of the sequence of IR images (126) of the scene (140) depicted in FIGS. 1.1 and 1.2 above. As shown in FIG. 5, the sequence of IR images (126) includes the IR image A (126a), IR image B (126b), IR image C (126c), etc. that are captured at the time point A (401a), time point B (401b), time point C (401c), etc. depicted in FIG. 4 above. According to the example of the light change pattern (124) described in reference to FIG. 4 above, the light source (e.g., light source A (143a), light source B (143b)) appears as an alternating dark and bright spot at a location marked "a1" or a location marked "a2" in the IR image A (126a), IR image B (126b), IR image C (126c), etc. In contrast, the light intensity remains substantially constant at another location marked "b" in the IR image A (126a), IR image B (126b), IR image C (126c), etc. For example, the location marked "a1" may be determined by subtracting intensity values of corresponding pixels in the IR image A (126a) and IR image B (126b) to generate the subtraction result (126d). Similarly, the location marked "a1" may be further determined by subtracting intensity values of corresponding pixels in the IR image B (126b) and IR image C (126c) to generate the subtraction result (126d). In the subtraction result (126d), black color indicates no difference and white color indicates a non-zero difference or a difference exceeding the aforementioned pre-determined threshold. Accordingly, the position of the light source (e.g., light source A (143a)) corresponds to the white spot in the subtraction result (126d). In another example, the location marked "a2" may be determined in a similar manner to detect the location of a different light source (e.g., light source B (143b)) within the IR images.

Further as shown in FIG. 5, the center of each IR image is defined as the target position (127). Accordingly, the position offset or distance from the location marked "a1" to the target position (127) corresponds to the displacement (125). The location marked "a1", the target position (127), and the displacement (125) shown in FIG. 5 are examples of the location A (126b), target position (127), and displacement (125), respectively, depicted in FIG. 1.3 above. In one or more embodiments, the location marked "a1" varies between the IR image A (126a), IR image B (126b), IR image C (126c), etc. The rate of change of the location marked "a1" across IR image A (126a), IR image B (126b), IR image C (126c), etc. corresponds to the movement parameter (128) depicted in FIG. 1.3 above. Although not explicitly shown, the displacement (125) and/or movement parameter (128) may also correspond to the location marked "a2" in a different example.

Figure 6:
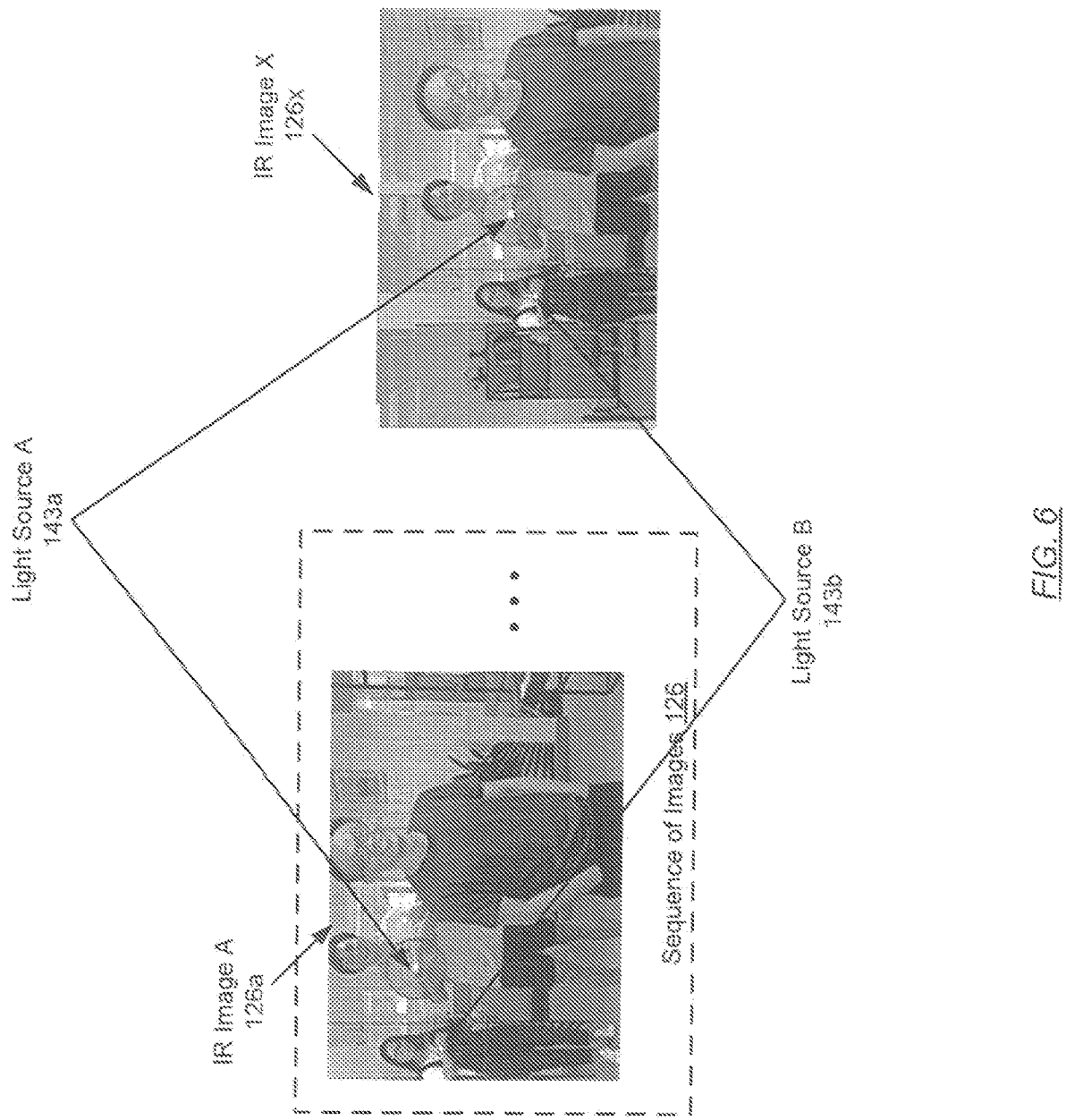

FIG. 6 shows an example of the sequence of IR images (126) described in reference to FIG. 4 above. In an example scenario, the target position is the center of the IR image. As shown in FIG. 6, when the object-identifying code A (402a) depicted in FIG. 4 above is used for object tracking, the light source A (143a) is identified at a location in the left portion of the IR images (e.g., IR image A (126a)) in the sequence of IR images (126). In particular, the light source A (143a) is reflective material included in a finger ring or part of a wrist band worn by a male person (i.e., object A (142a) as a main character). For example, the position of the light source A (143a) is identified based on the alternating dark and bright spot "a1" in the IR image A (126a), IR image B (126b), IR image C (126c), etc. depicted in FIG. 5 above. In particular, the alternating dark and bright spot "a1" in the IR image A (126a), IR image B (126b), IR image C (126c), etc. exhibits temporal and/or spatial variation that defines the object-identifying code A (402a) associated with the light source A (143a). Because the target position (i.e., image center) is to the right of the light source location, the object automated image capture controller (120) is configured to orient the camera device (110) toward the left such that the male person (i.e., object A (142a) as the main character) holding/wearing the light source A (143a) appears in the center of the IR image. Accordingly, using the object-identifying code A (402a), the orientation of the camera device (110) is adjusted based on the identified location "a1" of the light source A (143a) such that the object A (142a) appears in the center of the IR image X (126x).

Further as shown in FIG. 6, when the object-identifying code B (402b) depicted in FIG. 4 above is used for object tracking, the light source B (143b) is identified at a location in the left portion of the IR images (e.g., IR image A (126a)) in the sequence of IR images (126). In particular, the light source B (143b) is a finger ring or part of a wrist band worn by a female person (i.e., object B (142b) as a supporting character). For example, the position of the light source B (143b) is identified based on the alternating dark and bright spot "a2" in the IR image A (126a), IR image B (126b), IR image C (126c), etc. depicted in FIG. 5 above. In particular, the alternating dark and bright spot "a2" in the IR image A (126a), IR image B (126b), IR image C (126c), etc. exhibits temporal and/or spatial variation that defines the object-identifying code B (402b) associated with the light source B (143b). Because the target position (i.e., image center) is to the right of the light source location, the object automated image capture controller (120) is configured to orient the camera device (110) toward the left such that the female person (i.e., object B (142b) as the supporting character) holding/wearing the light source B (143b) appears in the center of the IR image. Accordingly, using the object-identifying code B (402b), the orientation of the camera device (110) is adjusted based on the identified location "a2" of the light source B (143b) such that the object B (142b) appears in the center of the IR image X (126x). By attaching different light sources having distinct object-identifying codes to multiple objects in the scene, object tracking may be switched expediently between different objects in the scene. For example, video recording may continue without disruption while switching the tracked object from the male person to the female person as described above.

To improve accuracy of object tracking, in addition to detecting the location of the reflective light source (143) based on the alternating dark and bright spot in the IR image A (126a), IR image B (126b), IR image C (126c), etc. depicted in FIG. 5 above, the geometric shape of the alternating dark and bright spot is qualified based on matching the geometric shape of the reflective material included in a finger ring or part of a wrist band worn by a male person (i.e., object A (142a)). In other words, any alternating dark and bright spot in the IR image A (126a), IR image B (126b), IR image C (126c), etc. that does not match the geometric shape of the reflective pattern is excluded in identifying the reflective light source (143).

Embodiments of the invention may be implemented on a computing system. Any combination of mobile, desktop, server, router, switch, embedded device, or other types of hardware may be used. For example, as shown in FIG. 7.1, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or microcores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (700) in FIG. 7.1 may be connected to or be a part of a network. For example, as shown in FIG. 7.2, the network (720) may include multiple nodes (e.g., node X (722), node Y (724)). Each node may correspond to a computing system, such as the computing system shown in FIG. 7.1, or a group of nodes combined may correspond to the computing system shown in FIG. 7.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7.1. Further, the client device (726) may include and/or perform all or a portion of one or more embodiments of the invention.

The computing system or group of computing systems described in FIGS. 7.1 and 7.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 7.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 7.1 and the nodes and/or client device in FIG. 7.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for image capture, comprising:
generating, using a hardware processor and by disposing a light sensing device at one or more locations in a scene, a direction of a visible light source from each of the one or more locations in the scene;
generating, based at least on the direction of the visible light source and a pre-determined image capture criterion, a physical configuration of the image capture, wherein the physical configuration comprises at least one selected from a group consisting of a target camera location and a target object location in the scene;
transmitting a command to a camera device to capture an image of an object in the scene based on the physical configuration of the image capture;
capturing, using the light sensing device and based on the physical configuration of the image capture, a measure of lighting of the object; and
determining, based on the measure of lighting of the object, that the pre-determined image capture criterion is satisfied prior to the image of the object to be captured,
wherein the pre-determined image capture criterion comprises one of front lighting, side lighting, and back lighting.

2. The method of claim 1, further comprising:
determining, based on the pre-determined image capture criterion, a target distance between the camera device and the object,
wherein the physical configuration of the image capture is generated based at least on the target distance, and
wherein the pre-determined image capture criterion comprises one of close-up, half-portrait, full-portrait, and wide-angle.

3. The method of claim 2, further comprising:
calculating a region-of-interest based on a dynamic model of the object; and
calculating a subject ratio of the object appears in the image captured by the camera device;

wherein the target distance is determined based at least on the subject ratio.

4. The method of claim 1, wherein generating the direction of the visible light source comprises:
capturing, using the camera device disposed at a first location of the one or more locations, a first plurality of images each being a portion of a photo sphere centered at the first location; and
detecting, by the hardware processor based on the first plurality of images, the direction of the visible light source from the first location, wherein the light sensing device is a visible light sensor of the camera device.

5. The method of claim 1, wherein the command specifies at least one selected from a group consisting of disposing the camera device at the target camera location and disposing the object at the target object location.

6. The method of claim 1, further comprising:
capturing, using at least an infrared (IR) sensor of the camera device, a second plurality of images of the scene;
detecting, by a hardware processor based on a pattern of local light change across the second plurality of images, an IR light source attached to the object in the scene; and
determining, in response to detecting the IR light source, a location of the object in the scene,
wherein transmitting the command to the camera device to capture the image of the object in the scene based on the physical configuration of the image capture comprises:
generating, based on the location of the object in the scene, control information for changing at least one selected from a group consisting of a field-of-view of the camera device and a crop field of the image such that the object appears in the image to substantially align with a target position within at least one selected from the group consisting of the field-of-view of the camera device and the crop field of the image.

7. The method of claim 6, further comprising:
based on the control information for changing the crop field of the image, cropping the image.

8. The method of claim 6,
wherein the IR light source is at least one selected from a group consisting of a local light emitter attached to the object and a reflective region of the object emitting an object-reflected light in response to a remote light emitter separate from the object,
wherein the pattern of local light change across the second plurality of images is produced by at least one selected from a group consisting of the local light emitter, the remote light emitter, and a geometric reflection pattern of the reflective region, and
wherein the pattern of local light change comprises at least one selected from a group consisting of a light intensity change, a light wavelength change, a repetition rate of the light intensity change, and a repetition rate of the light wavelength change.

9. The method of claim 1, further comprising:
generating a location control signal to direct a moving platform to move to the target camera location; and
generating an orientation control signal to orient the field-of-view of the camera device toward the object from the target camera location,
wherein the camera device is disposed on the moving platform.

10. The method of claim 9, wherein the moving platform is a robotic platform holding the camera device and driven by the location control signal to move to the target camera location.

11. The method of claim 9, wherein the moving platform is a human user holding the camera device, wherein based on the location control signal, the camera device outputs an instruction directing the human user to move to the target camera location.

12. The method of claim 1, wherein transmitting the command to the camera device to capture the image of the object in the scene based on the physical configuration of the image capture further comprises:
generating an instruction directing the object to move to the target camera location.

13. The method of claim 1,
wherein the target camera location is one of a plurality of target camera locations,
wherein the image of the object is one of a plurality of images that are captured from the plurality of target camera locations to form a portion of a movie recording, and
wherein each of the plurality of images is assigned a corresponding pre-determined image capture criterion specified by a movie script.

14. The method of claim 13, further comprising:
analyzing the movie script to determine a plurality of pre-determined image capture criteria;
generating, based at least on the plurality of pre-determined image capture criteria, the plurality of target camera locations in the scene; and
transmitting a command to the image camera device disposed at the plurality of target camera locations in the scene to capture the portion of the movie recording.

15. The method of claim 14,
wherein the object corresponds to a first body of a main character and a second body of a supporting character of the movie recording,
wherein the IR light source comprises:
a first IR light source attached to the first body and configured to produce an object-identifying code identifying the main character, and a second IR light source attached to the second body and configured to produce the object-identifying code identifying the supporting character,
wherein generating the plurality of target camera locations in the scene is further based on the object-identifying code, and
wherein each of the plurality of pre-determined image capture criteria comprises:
the target position and a target size of a visible portion of at least one body selected from a group consisting of the first body and the second body in the image of the object; and
one of front lighting, side lighting, and back lighting of the at least one human body.

16. An image capture controller, comprising:
a computer processor; and
a memory coupled to the computer processor, the memory storing instructions, when executed, causing the computer processor to:
generate, by disposing a light sensing device at one or more locations in a scene, a direction of a visible light source from each of the one or more locations in the scene;
generate, based at least on the direction of the visible light source and a pre-determined image capture criterion, a physical configuration of the image capture, wherein the physical configuration comprises at least one selected from a group consisting of a target camera location and a target object location in the scene;

transmit a command to a camera device to capture an image of an object in the scene based on the physical configuration of the image capture;

capture, using the light sensing device and based on the physical configuration of the image capture, a measure of lighting of the object; and determine, based on the measure of lighting of the object, that the pre-determined image capture criterion is satisfied prior to the image of the object to be captured, wherein the pre-determined image capture criterion comprises one of front lighting, side lighting, and back lighting.

17. The image capture controller of claim 16, the instructions, when executed, further causing the computer processor to:

determine, based on the pre-determined image capture criterion, a target distance between the camera device and the object, wherein the physical configuration of the image capture is generated based at least on the target distance, and wherein the pre-determined image capture criterion comprises one of close-up, half-portrait, full-portrait, and wide-angle.

18. The image capture controller of claim 17, the instructions, when executed, further causing the computer processor to:

calculate a region-of-interest based on a dynamic model of the object; and calculate a subject ratio of the object appears in the image captured by the camera device;

wherein the target distance is determined based at least on the subject ratio.

19. The image capture controller of claim 16, wherein generating the direction of the visible light source comprises:

capturing, using the camera device disposed at a first location of the one or more locations, a first plurality of images each being a portion of a photo sphere centered at the first location; and detecting, by the hardware processor based on the first plurality of images, the direction of the visible light source from the first location, wherein the light sensing device is a visible light sensor of the camera device.

20. The image capture controller of claim 16, wherein the command specifies at least one selected from a group consisting of disposing the camera device at the target camera location and disposing the object at the target object location.

21. The image capture controller of claim 16, the instructions, when executed, further causing the computer processor to:

capture, using at least an infrared (IR) sensor of the camera device, a second plurality of images of the scene;

detect, based on a pattern of local light change across the second plurality of images, an IR light source attached to the object in the scene; and determine, in response to detecting the IR light source, a location of the object in the scene, wherein transmitting the command to the camera device to capture the image of the object in the scene based on the physical configuration of the image capture comprises:

generating, based on the location of the object in the scene, control information for changing at least one selected from a group consisting of a field-of-view of the camera device and a crop field of the image such that the object appears in the image to substantially align with a target position within at least one selected from the group consisting of the field-of-view of the camera device and the crop field of the image.

22. The image capture controller of claim 21, wherein the IR light source is at least one selected from a group consisting of a local light emitter attached to the object and a reflective region of the object emitting an object-reflected light in response to a remote light emitter separate from the object, wherein the pattern of local light change across the second plurality of images is produced by at least one selected from a group consisting of the local light emitter, the remote light emitter, and a geometric reflection pattern of the reflective region, and wherein the pattern of local light change comprises at least one selected from a group consisting of a light intensity change, a light wavelength change, a repetition rate of the light intensity change, and a repetition rate of the light wavelength change.

23. The image capture controller of claim 16, the instructions, when executed, further causing the computer processor to:

generate a location control signal to direct a moving platform to move to the target camera location; and generate an orientation control signal to orient the field-of-view of the camera device toward the object from the target camera location, wherein the camera device is disposed on the moving platform.

24. The image capture controller of claim 23, wherein the moving platform is a robotic platform holding the camera device and driven by the location control signal to move to the target camera location.

25. The image capture controller of claim 23, wherein the moving platform is a human user holding the camera device, wherein based on the location control signal, the camera device outputs an instruction directing the human user to move to the target camera location.

26. The image capture controller of claim 16, wherein transmitting the command to the camera device to capture the image of the object in the scene based on the physical configuration of the image capture further comprises:

generating an instruction directing the object to move to the target camera location.

27. The image capture controller of claim 16, wherein the target camera location is one of a plurality of target camera locations, wherein the image of the object is one of a plurality of images that are captured from the plurality of target camera locations to form a portion of a movie recording, and wherein each of the plurality of images is assigned a corresponding pre-determined image capture criterion specified by a movie script.

28. The image capture controller of claim 27, further configured to:

analyze a movie script to determine a plurality of pre-determined image capture criteria;

generate, based at least on the plurality of pre-determined image capture criteria, the plurality of target camera locations in the scene; and transmit a command to the image camera device disposed at the plurality of target camera locations in the scene to capture the portion of the movie recording.

29. The image capture controller of claim 28, wherein the object corresponds to a first body of a main character and a second body of a supporting character of the movie recording, wherein the IR light source comprises:

a first IR light source attached to the first body and configured to produce an object-identifying code identifying the main character, and a second IR light source attached to the second body and configured to produce the object-identifying code identifying the supporting character, wherein generating the plurality of target camera locations in the scene is further based on the object-identifying code, and wherein each of the plurality of pre-determined image capture criteria comprises:

the target position and a target size of a visible portion of at least one body selected from a group consisting of the first body and the second body in the image of the object; and one of front lighting, side lighting, and back lighting of the at least one human body.

30. A system for image capture, comprising:

a light sensing device;

a camera device; and an image capture controller configured to:

generate, by disposing the light sensing device at one or more locations in a scene, a direction of a visible light source from each of the one or more locations in the scene;

generate, based at least on the direction of the visible light source and a pre-determined image capture criterion, a physical configuration of the image capture, wherein the physical configuration comprises at least one selected from a group consisting of a target camera location and a target object location in the scene;

transmit a command to a camera device to capture an image of an object in the scene based on the physical configuration of the image capture;

capture, using the light sensing device and based on the physical configuration of the image capture, a measure of lighting of the object; and determine, based on the measure of lighting of the object, that the pre-determined image capture criterion is satisfied prior to the image of the object to be captured, wherein the pre-determined image capture criterion comprises one of front lighting, side lighting, and back lighting.

31. The system of claim 30, the image capture controller further configured to:

determine, based on the pre-determined image capture criterion, a target distance between the camera device and the object, wherein the physical configuration of the image capture is generated based at least on the target distance, and wherein the pre-determined image capture criterion comprises one of close-up, half-portrait, full-portrait, and wide-angle.

32. The system of claim 31, the image capture controller further configured to:

calculate a region-of-interest based on a dynamic model of the object; and calculate a subject ratio of the object appears in the image captured by the camera device;

wherein the target distance is determined based at least on the subject ratio.

33. The system of claim 30, wherein generating the direction of the visible light source comprises:

capturing, using the camera device disposed at a first location of the one or more locations, a first plurality of images each being a portion of a photo sphere centered at the first location; and detecting, by the hardware processor based on the first plurality of images, the direction of the visible light source from the first location, wherein the light sensing device is a visible light sensor of the camera device.

34. The system of claim 30, wherein the command specifies at least one selected from a group consisting of disposing the camera device at the target camera location and disposing the object at the target object location.

35. The system of claim 30, the image capture controller further configured to:

capture, using at least an infrared (IR) sensor of the camera device, a second plurality of images of the scene;

detect, based on a pattern of local light change across the second plurality of images, an IR light source attached to the object in the scene; and determine, in response to detecting the IR light source, a location of the object in the scene, wherein transmitting the command to the camera device to capture the image of the object in the scene based on the physical configuration of the image capture comprises:

generating, based on the location of the object in the scene, control information for changing at least one selected from a group consisting of a field-of-view of the camera device and a crop field of the image such that the object appears in the image to substantially align with a target position within at least one selected from the group consisting of the field-of-view of the camera device and the crop field of the image.

36. The system of claim 35, wherein the IR light source is at least one selected from a group consisting of a local light emitter attached to the object and a reflective region of the object emitting an object-reflected light in response to a remote light emitter separate from the object, wherein the pattern of local light change across the second plurality of images is produced by at least one selected from a group consisting of the local light emitter, the remote light emitter, and a geometric reflection pattern of the reflective region, and wherein the pattern of local light change comprises at least one selected from a group consisting of a light intensity change, a light wavelength change, a repetition rate of the light intensity change, and a repetition rate of the light wavelength change.

37. The system of claim 30, the image capture controller further configured to:

generate a location control signal to direct a moving platform to move to the target camera location; and generate an orientation control signal to orient the field-of-view of the camera device toward the object from the target camera location, wherein the camera device is disposed on the moving platform.

38. The system of claim 37, wherein the moving platform is a robotic platform holding the camera device and driven by the location control signal to move to the target camera location.

39. The system of claim 37, wherein the moving platform is a human user holding the camera device, wherein based on the location control signal, the camera device outputs an instruction directing the human user to move to the target camera location.

40. The system of claim 30, wherein transmitting the command to the camera device to capture the image of the object in the scene based on the physical configuration of the image capture further comprises:
generating an instruction directing the object to move to the target camera location.

41. The system of claim 30,
wherein the target camera location is one of a plurality of target camera locations,
wherein the image of the object is one of a plurality of images that are captured from the plurality of target camera locations to form a portion of a movie recording, and
wherein each of the plurality of images is assigned a corresponding pre-determined image capture criterion specified by a movie script.

42. The system of claim 41, the image capture controller further configured to:
analyze a movie script to determine a plurality of pre-determined image capture criteria;
generate, based at least on the plurality of pre-determined image capture criteria, the plurality of target camera locations in the scene; and
transmit a command to the image camera device disposed at the plurality of target camera locations in the scene to capture the portion of the movie recording.

43. The system of claim 42,
wherein the object corresponds a first body of a main character and a second body of a supporting character of the movie recording, wherein the IR light source comprises:
a first IR light source attached to the first body and configured to produce an object-identifying code identifying the main character, and a second IR light source attached to the human body and configured to produce the object-identifying code identifying the supporting character,
wherein generating the plurality of target camera locations in the scene is further based on the object-identifying code, and
wherein each of the plurality of pre-determined image capture criteria comprises:
the target position and a target size of a visible portion of at least one body selected from a group consisting of the first body and the second body in the image of the object; and
one of front lighting, side lighting, and back lighting of the at least one human body.

44. A non-transitory computer readable medium storing instructions for image capture, the instructions, when executed by a computer processor, comprising functionality for:
generating, by disposing a light sensing device at one or more locations in a scene, a direction of a visible light source from each of the one or more locations in the scene;
generating, based at least on the direction of the visible light source and a pre-determined image capture criterion, a physical configuration of the image capture, wherein the physical configuration comprises at least one selected from a group consisting of a target camera location and a target object location in the scene;
transmitting a command to a camera device to capture an image of an object in the scene based on the physical configuration of the image capture;
capturing, using the light sensing device and based on the physical configuration of the image capture, a measure of lighting of the object; and
determining, based on the measure of lighting of the object, that the pre-determined image capture criterion is satisfied prior to the image of the object to be captured,
wherein the pre-determined image capture criterion comprises one of front lighting, side lighting, and back lighting.

* * * * *